(12) United States Patent
Asao et al.

(10) Patent No.: US 6,690,099 B2
(45) Date of Patent: Feb. 10, 2004

(54) AUTOMOTIVE ALTERNATOR

(75) Inventors: Yoshihito Asao, Tokyo (JP); Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 13 days.

(21) Appl. No.: 09/964,697

(22) Filed: Sep. 28, 2001

(65) Prior Publication Data

US 2002/0093254 A1 Jul. 18, 2002

(30) Foreign Application Priority Data

Jan. 16, 2001 (JP) ........................................ 2001-007924

(51) Int. Cl.⁷ ............................................. H02K 1/00
(52) U.S. Cl. ........................ 310/216; 310/254; 310/263
(58) Field of Search ................................ 310/216, 217, 310/218, 58–60 R, 254; 29/296–598

(56) References Cited

U.S. PATENT DOCUMENTS 3,886,256 A * 5/1975 Ohuchi et al. ............... 310/216

| | | |
|---|---|---|
| 4,654,551 A | 3/1987 | Farr |
| 5,233,255 A | 8/1993 | Kusumoto et al. |
| 5,561,334 A | 10/1996 | Ishida et al. |
| 5,642,013 A | 6/1997 | Wavre |
| 5,804,896 A | 9/1998 | Takehara et al. |
| 6,023,119 A | 2/2000 | Asao |
| 6,218,758 B1 * | 4/2001 | Miura et al. ............. 310/254 |

FOREIGN PATENT DOCUMENTS

| | | |
|---|---|---|
| EP | 0314860 | 5/1989 |
| EP | 0881752 | 12/1998 |
| EP | 0 917 278 | 5/1999 |
| JP | 4-26345 | 1/1992 |
| JP | 2000-134887 | 5/2000 |

OTHER PUBLICATIONS

Patent Abstracts of Japan, vol. 007, No. 226, Oct. 7, 1983.
Patent Abstracts of Japan, vol. 1996, No. 11, Nov. 29, 1996.
Patent Abstracts of Japan, vol. 2000, No. 02, Feb. 29, 2000.

* cited by examiner

*Primary Examiner*—Tran Nguyen
(74) *Attorney, Agent, or Firm*—Sughrue Mion, PLLC

(57) ABSTRACT

Tooth portions of a stator core are formed such that a radial length ht and a width bt thereof satisfy an expression <bt/ht<0.4.

18 Claims, 15 Drawing Sheets

AUTOMOTIVE ALTERNATOR

This application is based on Application No. 2001-7924, filed in Japan on Jan. 16, 2001, the contents of which are hereby incorporated by reference.

BACKGROUND OF THE INVENTION

1. Field of the Invention

The present invention relates to an automotive alternator and particularly to an automotive alternator in which cooling of a stator is improved by making cooling airflows flow through cooling airflow ventilation channels formed by coil end groups of a stator winding and tooth portions of a stator core.

2. Description of the Related Art

FIG. 22 is a cross section showing a conventional automotive alternator, FIG. 23 is a perspective showing a stator used in the conventional automotive alternator, FIG. 24 is a schematic diagram explaining a method for manufacturing a conventional stator core, and FIG. 25 is a plan showing the conventional stator core.

In FIGS. 22 and 23, the conventional automotive alternator includes: a case 3 constituted by an aluminum front bracket 1 and an aluminum rear bracket 2; a shaft 6 disposed inside the case 3, a pulley 4 being secured to a first end of the shaft 6; a Lundell-type rotor 7 secured to the shaft 6; cooling fans 5 secured to first and second axial end portions of the rotor 7; a stator 8 secured to the case 3 so as to envelop the rotor 7; slip rings 9 secured to a second end of the shaft 6 for supplying electric current to the rotor 7; a pair of brushes 10 sliding on surfaces of the slip rings 9; a brush holder 11 accommodating the brushes 10; a rectifier 12 having a rectifier heat sink 12a, the rectifier 12 being electrically connected to the stator 8 for converting alternating current generated in the stator 8 into direct current; and a regulator 18 mounted to a regulator heat sink 17 fitted onto the brush holder 11, the regulator 18 adjusting the magnitude of the alternating voltage generated in the stator 8.

The rotor 7 is constituted by: a field winding 13 for generating magnetic flux on passage of an electric current; and a pair of first and second pole cores 20 and 21 disposed so as to cover the field winding 13, magnetic poles being formed in the first and second pole cores 20 and 21 by magnetic flux generated in the field winding 13. The pair of first and second pole cores 20 and 21 are made of iron, each has a plurality of first and second claw-shaped magnetic poles 22 and 23 having a generally trapezoidal outermost diameter surface shape disposed on an outer circumferential edge portion at even angular pitch in a circumferential direction so as to project axially, and the first and second pole cores 20 and 21 are fixed to the shaft 6 facing each other such that the first and second claw-shaped magnetic poles 22 and 23 intermesh.

The stator 8 is constituted by: a cylindrical stator core 15 in which slots 33 extending parallel to an axial direction are arranged at an even angular pitch in a circumferential direction; and a stator winding 16 installed in the slots 33 of the stator core 15. The stator winding 16 is constituted by three wave-winding phase portions each formed by installing a conductor wire 29, functioning as an electrical conductor composed of a copper wire material having a circular cross section coated with electrical insulation, into a wave shape in every third slot 33. The wave-winding phase portions are each installed in the stator core 15 such that the slots 33 in which each wave-winding phase portion is installed are offset by one slot from those of each of the other wave-winding phase portions. In addition, the wave-winding phase portions are each formed by winding the conductor wire 29 into a distributed winding. The stator 8 is held between the front bracket 1 and the rear bracket 2 so as to form a uniform air gap between outer circumferential surfaces of the first and second claw-shaped magnetic poles 22 and 23 and an inner circumferential surface of the stator core 15.

Moreover, the number of magnetic poles in the rotor 7 is twelve, and there are thirty-six slots 33 formed in the stator core 15. In other words, the slots are formed at a ratio of one per phase per pole. The stator winding 16 is formed into a three-phase alternating-current winding by forming the three wave-winding phase portions into an alternating-current connection (a Y connection, for example).

A method for manufacturing the stator core 15 will now be explained with reference to FIG. 24.

First, a long magnetic steel plate 30 is supplied to a pressworking machine (not shown), and formed into tooth portions 30a and a base portion 30b. Then, the magnetic steel plate 30 is supplied to a core manufacturing device (not shown). Here, the magnetic steel plate 30 is bent and wound up into a helical shape by intermeshing pins 34 in gaps 30c defined by the tooth portions 30a, and the base portion 30b. as shown in FIG. 24. The magnetic steel plate 30 is laminated to a predetermined thickness and then cut. Outer circumferential portions of the magnetic steel plate wound up in this manner are welded to obtain the stator core 15 shown in FIG. 25. Here, the tooth portions 30a and the base portion 30b are each stacked up in the wound magnetic steel plate 30 in the direction of lamination.

As shown in FIG. 25, the stator core 15 manufactured in this manner includes: a cylindrical base portion 32; tooth portions 31 each extending from an inner circumferential surface of the base portion 32 toward an axial center; and the slots 33, which are defined by the base portion 32 and adjacent pairs of the tooth portions 31. The tooth portions 31 are disposed at an even angular pitch on the inner circumferential surface of the base portion 32.

In the conventional automotive alternator constructed in this manner, an electric current is supplied from a battery (not shown) through the brushes 10 and the slip rings 9 to the field winding 13, generating a magnetic flux. The first claw-shaped magnetic poles 22 on the first pole core 20 are magnetized into North-seeking (N) poles by this magnetic flux, and the second claw-shaped magnetic poles 23 on the second pole core 21 are magnetized into South-seeking (S) poles.

At the same time, the pulley 4 is driven by an engine and the rotor 7 is rotated by the shaft 6. A rotating magnetic field is applied to the stator core 15 due to the rotation of the rotor 7, generating an electromotive force in the stator winding 16. Then, the alternating electromotive force generated in the stator winding 16 is converted into direct current by the rectifier 12 and the magnitude of the output voltage thereof is adjusted by the regulator 18, recharging the battery.

Now, the field winding 13, the stator winding 16, the rectifier 12, and the regulator 18 are constantly generating heat during power generation, and in an automotive alternator having a rated output current in the 100 A class, the amount of heat generated at rotational frequencies at which the temperature is high is 60 W, 500 W, 120 W, and 6 W, respectively.

Thus, in order to cool the heat generated by power generation, front-end and rear-end air intake apertures 1a and 2a are disposed through axial end surfaces of the front bracket 1 and the rear bracket 2, and front-end and rear-end air discharge apertures 1b and 2b are disposed through radial side surfaces of the front bracket 1 and the rear bracket 2 so as to face coil end groups 16f and 16r of the stator winding 16.

Thus, the cooling fans 5 are rotated and driven together with the rotation of the rotor 7, and cooling airflow channels are formed in which external air is sucked inside the case 3 through the front-end and rear-end air intake apertures 1a and 2a, flows axially towards the rotor 7, is then deflected centrifugally by the cooling fans 5, thereafter crosses the coil end groups 16f and 16r, and is discharged outside through the front-end and rear-end air discharge apertures 1b and 2b. Furthermore, as a result of a pressure difference between a front end and a rear end of the rotor 7, a cooling airflow channel is formed in which cooling air flows through the inside of the rotor 7 from the front end to the rear end.

As a result, heat generated in the stator winding 16 is dissipated from the coil end groups 16f and 16r to the cooling airflows, suppressing temperature increases in the stator 8. Furthermore, heat generated in the rectifier 12 and the regulator 18 is dissipated to a cooling airflow by means of the rectifier heat sink 12a and the regulator heat sink 17, thereby suppressing temperature increases in the rectifier 12 and the regulator 18. In addition, heat generated in the field winding 13 is dissipated to the cooling airflow which flows through the inside of the rotor 7, thereby suppressing temperature increases in the rotor 7.

In the conventional automotive alternator constructed in this manner, it is important to suppress temperature increases in the stator winding 16, which is the largest heat-generating part. Since the cooling airflow formed by the cooling fans 5 and the rotor 7 flows through the coil end groups 16f and 16r of the stator winding 16 from an inner circumferential side in a radial direction, heat generated in the stator winding 16 is dissipated from the coil end groups 16f and 16r to the cooling airflow, thereby suppressing temperature increases in the stator 8.

Now, in an actual alternator, the ambient temperature under the worst operating conditions is 90° C. Furthermore, a varnish which is impregnated into the slots 33 of the stator core 15 and which bonds the stator core 15 and the stator winding 16 has a softening temperature of 230° C. Thus, when decreased output caused by decreased field current due to increased ambient temperature is taken into consideration, the temperature of the stator 8 can be prevented from exceeding the softening temperature of the varnish even under the worst operating conditions if temperature increases in the stator core 8 are suppressed to 140° C. or less at an ambient temperature of 90° C. A temperature increase of 140° C. at an ambient temperature of 90° C. corresponds to a temperature increase of 170° C. at an ambient temperature of 20° C.

If the varnish reaches its softening temperature, heat degradation is promoted and bonding between the stator core 15 and the stator winding 16 is loosened. Loosening of bonding between the stator core 15 and the stator winding 16 leads to rubbing between the conductor wires 29 of the stator winding 16 and the stator core 15, damaging the electrically-insulating coating of the conductor wires 29 and causing deterioration in electrical insulation.

The present applicants have focused on ventilation channels passing through gaps between the coil end groups 16f and 16r of the stator winding 16 and end surfaces of the stator core 15, and have found that a ratio (bt/ht) between a width bt and a radial length ht of the tooth portions 31, which define these ventilation channels as shown in FIG. 26, affects the cooling of the stator winding 16.

However, until now, no consideration had been given to the ratio (bt/ht) between the width bt and the radial length ht of the tooth portions 31. The stator core 15 used in the conventional automotive alternator has a ratio bt/ht approximately equal to 0.42 (bt=4.8 mm; ht=11.4 mm), for example. When a saturation temperature of the stator 8 was measured with the automotive alternator generating power at full load under stable output conditions, the value of increase in the saturation temperature from an experimental ambient temperature (20° C.) was calculated to be 173° C. Consequently, in the conventional automotive alternator one problem has been that, under the worst operating conditions, the temperature of the stator 8 exceeds the softening temperature of the varnish, promoting heat degradation and causing electrical insulation to deteriorate.

SUMMARY OF THE INVENTION

The present invention aims to solve the above problems and an object of the present invention is to provide an automotive alternator enabling heat degradation tolerance to be improved and deterioration in electrical insulation to be suppressed by appropriately setting a ratio (bt/ht) between the width bt and the radial length ht of tooth portions such that heat dissipation of a stator winding is improved, thereby keeping the temperature of a stator below a softening temperature of a varnish even under the worst operating conditions.

In order to achieve the above object, according to one aspect of the present invention, there is provided an automotive alternator including:

a shaft rotatably supported by a case;

a rotor fixed to the shaft, the rotor being provided with:
  a field winding for generating a magnetic flux on passage of an electric current therethrough; and
  a plurality of claw-shaped magnetic poles disposed circumferentially on an outer circumferential side of the field winding, the claw-shaped magnetic poles being magnetized by the magnetic flux generated by the field winding; and a stator provided with:
  a cylindrical stator core supported by the case so as to envelop the rotor, a plurality of slots extending axially being formed in the stator core so as to line up circumferentially; and
  a stator winding installed in the stator core, wherein the stator core is constructed by laminating a magnetic steel plate, the stator core being provided with:
  a cylindrical base portion;
  a plurality of tooth portions disposed so as to extend from the base portion toward an axial center; and
  the plurality of slots, each of the slots being defined by the base portion and an adjacent pair of the tooth portions;
  ventilation channels are formed by a coil end group of the stator winding and the tooth portions of the stator core, a cooling airflow generated by rotation of the rotor flowing through each of the ventilation channels in a radial direction from an inner circumferential side; and
  each of the tooth portions ia formed such that a radial length ht and a width bt thereof satisfy an expression $0.15 < bt/ht < 0.4$.

A cooling fan may be fixed to an axial end surface of the rotor.

Air discharge apertures may be formed in a radial side surface of the case so as to correspond to the ventilation channels.

An entire axial length of a blade of the cooling fan may substantially overlap the coil end group in a radial direction.

The stator winding may be installed in the stator core as a distributed winding.

The stator winding may be constituted by a plurality of winding sub-portions each constructed by installing an electrical conductor so as to alternately occupy an inner layer and an outer layer in a slot depth direction in the slots at a predetermined slot interval.

The slots may be formed at a ratio of two or more per phase per pole.

The ventilation channels may be arranged at a non-uniform pitch.

DETAILED DESCRIPTION OF THE PREFERRED EMBODIMENTS

The preferred embodiments of the present invention will now be explained with reference to the drawings.

EMBODIMENT 1

Figure 1:
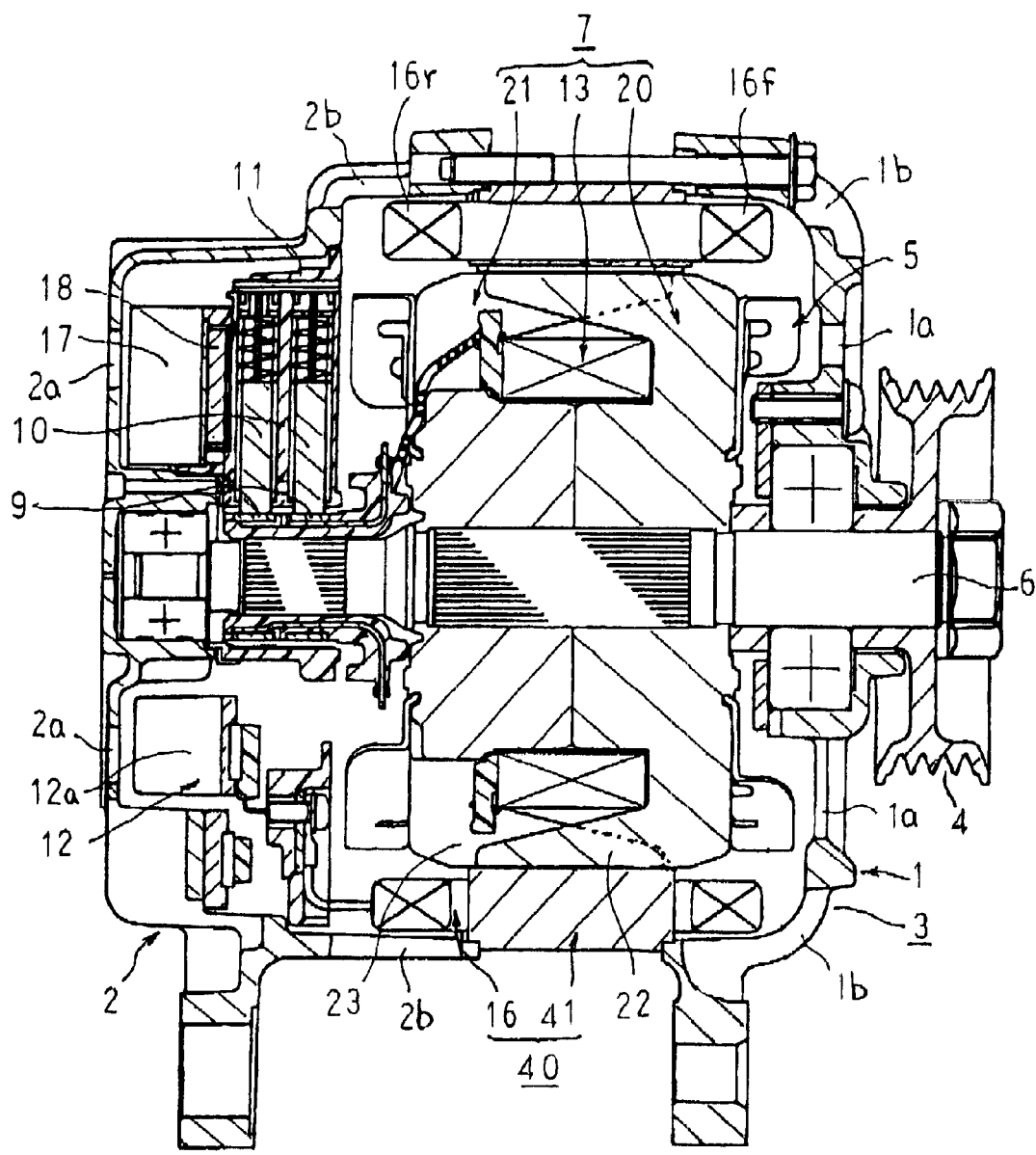
FIG. 1 is a cross section showing an automotive alternator according to Embodiment 1 of the present invention.
Figure 2:
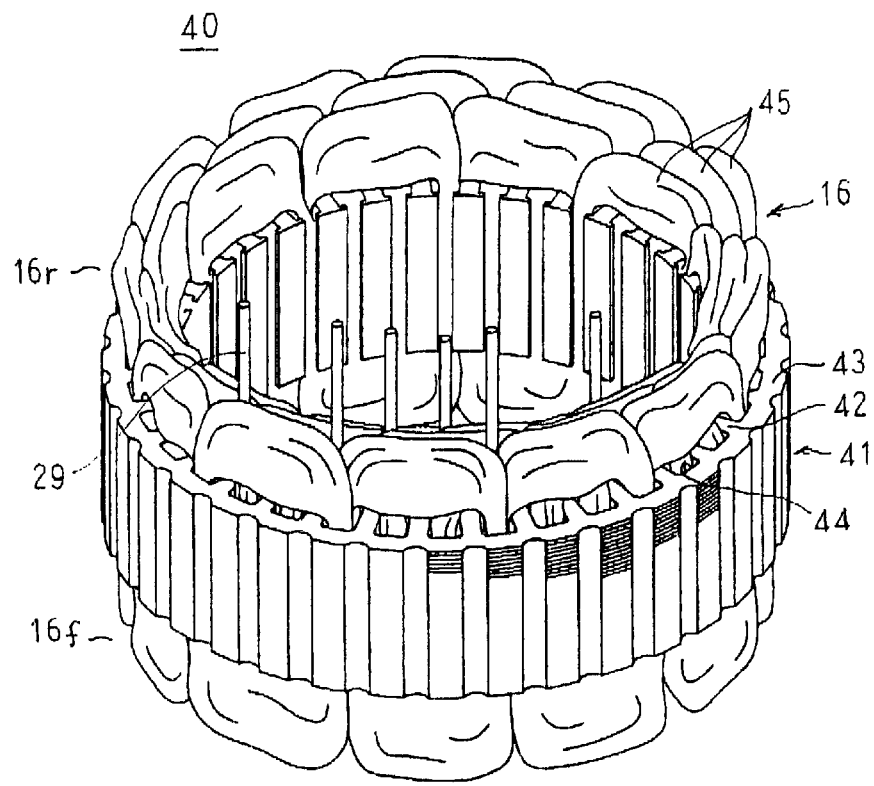
FIG. 2 is a perspective showing a stator of the automotive alternator according to Embodiment 1 of the present invention.
Figure 3:
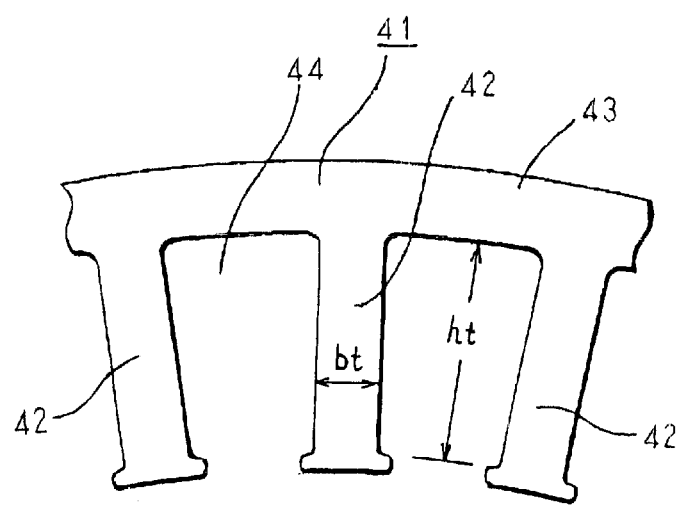
FIG. 3 is an enlarged partial plan showing a stator core of the automotive alternator according to Embodiment 1 of the present invention.
Figure 4:
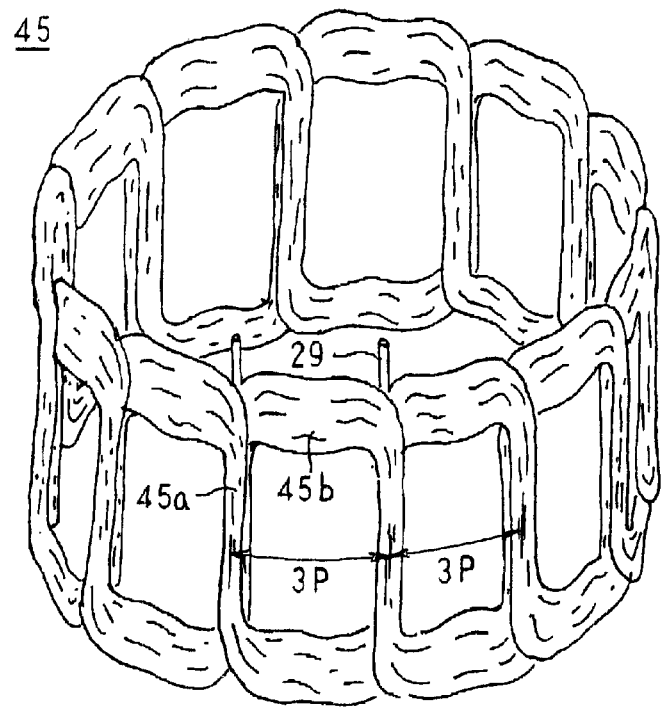
FIG. 4 is a perspective schematically showing one winding phase portion constituting a stator winding of the automotive alternator according to Embodiment 1 of the present invention.
Figure 5:
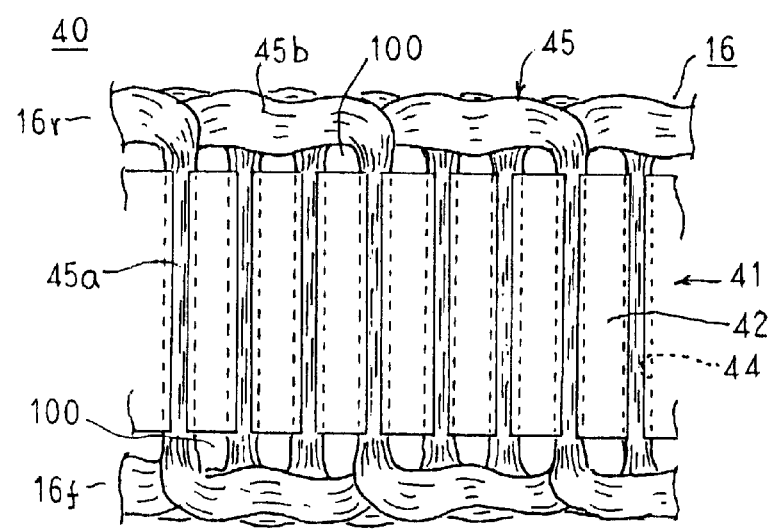
FIG. 5 is a partial side elevation showing the stator of the automotive alternator according to Embodiment 1 of the present invention.

FIG. 1 is a cross section showing an automotive alternator according to Embodiment 1 of the present invention, FIG. 2 is a perspective showing a stator of the automotive alternator according to Embodiment 1 of the present invention, FIG. 3 is an enlarged partial plan showing a stator core of the automotive alternator according to Embodiment 1 of the present invention, FIG. 4 is a perspective schematically showing one winding phase portion constituting a stator winding of the automotive alternator according to Embodiment 1 of the present invention, and FIG. 5 is a partial side elevation showing the stator of the automotive alternator according to Embodiment 1 of the present invention. Moreover, in the figures, portions the same as or corresponding to those in the conventional automotive alternator shown in FIGS. 22 to 26 will be given the same numbering, and explanation thereof will be omitted.

In FIGS. 1 to 5, a stator 40 is constituted by: a cylindrical stator core 41; and a stator winding 16 installed in the stator core 41. The stator 40 is fitted into and held between a front bracket 1 and a rear bracket 2 so as to form a uniform air gap between outer circumferential surfaces of first and second claw-shaped magnetic poles 22 and 23 and an inner circumferential surface of the stator core 41.

Next, a construction of the stator 40 will be explained in detail.

The stator core 41 is prepared in a similar manner to the conventional stator core 15 by laminating a magnetic steel plate 30, and includes: a cylindrical base portion 43; tooth portions 42 each extending from an inner circumferential surface of the base portion 43 toward an axial center; and slots 44 which are defined by the base portion 43 and adjacent pairs of the tooth portions 42. The tooth portions 42 are arranged at an even angular pitch on the inner circumferential surface of the base portion 43. The tooth portions 42 are each formed at a ratio of bt/ht=0.35 (bt=4.0 mm, ht=11.4 mm), where bt is a width dimension of each of the tooth portions and ht is a radial length dimension of each of the tooth portions. Moreover, thirty-six slots 44 are formed for twelve magnetic poles in the rotor 7. In other words, the slots are formed at a ratio of one per phase per pole.

The stator winding 16 is constituted by a three-phase alternating-current winding in which three winding phase portions 45 are formed into an alternating-current connection (a Y connection, for example), the winding phase portions 45 each being formed by winding a conductor wire 29 in a wave shape into every third slot 44, the conductor wire 29 functioning as an electrical conductor composed of a copper wire material having a circular cross section coated with an electrical insulator.

The winding phase portions 45 are each constructed into a wave winding in which the conductor wire 29 is wound for a predetermined number of winds, the winding phase portions 45 each being formed as shown in FIG. 4 into a distributed winding portion having a wave-shaped pattern composed of: twelve slot-housed portions 45a arranged at a pitch of three slots (3P) in a circumferential direction; and linking portions 45b linking together a first half of end portions of adjacent pairs of the slot-housed portions 45a alternately at first and second axial ends and linking together a second half of the end portions alternately at the first and second axial ends. The winding phase portions 45 are installed in the stator core 41 such that the slot-housed portions 45a are housed in every third slot 44. The linking portions 45b linking together the end portions of the adjacent pairs of the slot-housed portions 45a extend circumferentially on axially outside the stator core 41, constituting coil ends. Here, a first half of the linking portions 45b extending outwards from any given slot 44 extend to a first circumferential side and enter a subsequent slot 44 three slots away on the first circumferential side, and a second half thereof extend to a second circumferential side and enter a subsequent slot 44 three slots away on the second circumferential side.

The three winding phase portions 45 are installed in the stator core 41 such that the groups of slots 44 in which each winding phase portion 45 is installed are offset by a pitch of one slot (1P) in a circumferential direction from each other and the three winding phase portions 45 are stacked into three layers radially. The coil ends (the linking portions 45b) of the three winding phase portions 45 constitute front-end and rear-end coil end groups 16f and 16r of the stator winding 16. Moreover, although not shown, a varnish is impregnated into the slots 44 which house the stator winding 16, fixing the stator winding 16 to the stator core 41.

As shown in FIG. 5, in the stator 40 constructed in this manner, ventilation channels 100 formed by the coil end groups 16f and 16r and the tooth portions 42 of the stator core 41 are arranged circumferentially. Front-end and rear-end air discharge apertures 1b and 2b are formed through radial side surfaces of the front bracket 1 and the rear bracket 2 so as to correspond to the ventilation channels 100.

The rest of the construction is similar to that of the automotive alternator shown in FIGS. 22 to 26.

According to Embodiment 1, because the ratio (bt/ht) between the width bt and the radial length ht of each of the tooth portions 42 of the stator core 41 is 0.35, the ventilation channels 100 formed thereby are narrow compared to those in the conventional stator 8 which has a ratio of bt/ht=0.42. Because cooling airflows generated by cooling fans 5 flow through the narrow ventilation channels 100, the speed of the cooling airflows is increased and heat generated in the stator winding 16 is efficiently dissipated to the cooling airflows, suppressing temperature increases in the stator 40.

Because temperature increases in the stator 40 are suppressed, output can be improved. In addition, heat degradation resulting from softening of the varnish is suppressed, whereby damage to the electrically-insulating coating on the conductor wires 29 of the stator winding 16 resulting from the conductor wires 29 rubbing against the stator core 41 is prevented, thereby improving electrical insulation even under the worst operating conditions.

Because the cooling fans 5 are fixed to axial end surfaces of the rotor 7, the cooling airflows are forcibly conveyed into the ventilation channels 100 by the cooling fans 5, increasing cooling of the coil end groups 16f and 16r.

Because the air discharge apertures 1b and 2b are disposed so as to correspond to the ventilation channels 100, the cooling airflows flowing through the ventilation channels 100 are speedily expelled through the air discharge apertures 1b and 2b. Hence, ventilation resistance is reduced, increasing cooling of the coil end groups 16f and 16r and reducing wind noise.

Because the stator core 41 is fitted into the front bracket 1 and the rear bracket 2, some of the heat generated in the stator winding 16 is transferred through the stator core 41 to the front and rear brackets 1 and 2. Then, the heat transferred to the front and rear brackets 1 and 2 is dissipated to the cooling airflows flowing through the front-end and rear-end air discharge apertures 1b and 2b. Hence, temperature reduction in the stator 40 is promoted.

Because the winding phase portions 45 constituting the stator winding 16 are each constituted by distributed winding portions, the linking portions 45b (coil ends) of each of the winding phase portions 45 extending from the slots 44 are distributed half each onto the first and second circumferential sides. Thus, because bundles of the linking portions 45b are thinner and irregularities in inner wall surfaces of the ventilation channels 100 are reduced, increasing cooling of the coil end groups 16f and 16r.

Figure 6:
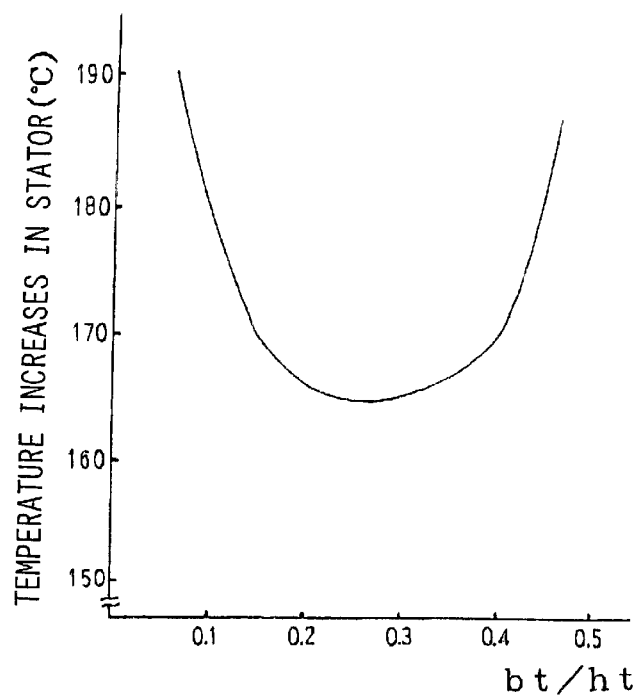
FIG. 6 is a graph showing a relationship between a ratio bt/ht in the stator core and temperature increase in the stator in the automotive alternator according to Embodiment 1 of the present invention.

A relationship between the ratio bt/ht and values of temperature increase in the stator 40 will now be investigated. FIG. 6 shows values of increase in saturation temperatures from an experimental ambient temperature (20° C.) when power was generated at full load under stable output conditions in an automotive alternator mounted with stators in which bt/ht was varied, and the saturation temperatures of the stators were measured. Moreover, in FIG. 6, bt/ht is represented on the horizontal axis, and values of temperature increase in the stators from the ambient temperature of the experiment (20° C.) are represented on the vertical axis. Furthermore, the automotive alternator was operated at 3000, 3500, 4000, 4500, and 5000 rpm, the saturation temperatures of the stators measured, and the largest values used as the saturation temperatures of the stators.

In FIG. 6, the values of temperature increase in the stators adopt a curve having a point of inflexion at bt/ht=0.27. In a region of the curve where bt/ht is greater than 0.15 and less than 0.27, the values of temperature increase in the stators increase slowly as bt/ht decreases, and in a region of the curve where bt/ht is less than 0.15, the values of temperature increase in the stators increase rapidly as bt/ht decreases. On the other hand, in a region of the curve where bt/ht is greater than 0.27 and less than 0.4, the values of temperature increase in the stators increase slowly as bt/ht increases, and in a region of the curve where bt/ht is greater than 0.4, the values of temperature increase in the stators increase rapidly as bt/ht increases. Thus, in a region of the curve where bt/ht is greater than 0.15 and less than 0.4, the values of temperature increase in the stators are suppressed to 170° C. or less.

It can be inferred from this that when bt/ht is less than 0.27, the ventilation channels 100 become narrow, increasing the speed of the cooling airflows flowing inside the ventilation channels 100, thereby promoting heat transfer from inner wall surfaces of the coil end groups constituting the ventilation channels 100, but when bt/ht is less than 0.15, the ventilation channels 100 become too narrow, making the cooling airflow rate through the ventilation channels 100 extremely small, thereby leading to a drop in cooling airflow speed and a deterioration in cooling. Furthermore, it can be inferred that when bt/ht is greater than 0.27, ventilation resistance in the ventilation channels 100 decreases sharply and the cooling airflow rate increases, effectively increasing the speed of the cooling airflows, thereby promoting heat transfer from inner wall surfaces of coil end groups constituting the ventilation channels 100, but when bt/ht is greater than 0.4, cross-sectional areas of the airflows in the ventilation channels 100 become too wide, leading to a drop in cooling airflow speed and a deterioration in cooling.

Now, since the softening temperature of the varnish is 230° C., when decreases in output resulting from reduced field current due to ambient temperature increases are taken into consideration, if the values of temperature increase at the ambient temperature of 90° C. are suppressed to 140° C. or less, the temperature of the stator can be prevented from exceeding the softening temperature of the varnish even under the worst operating conditions. A temperature increase of 140° C. at an ambient temperature of 90° C. corresponds to a temperature increase of 170° C. at an ambient temperature of 20° C. Consequently, in consideration of softening of the varnish, it can be seen from FIG. 6 that it is desirable to make bt/ht greater than 0.15 and less than 0.4, Thus, an automotive alternator can be achieved in which resistance to heat degradation is improved and deterioration in electrical insulation resulting from loosening of the bonding between the stator winding 16 and the stator core 41 is suppressed.

In addition, it can be seen from FIG. 6 that where bt/ht is greater than or equal to 0.22 and less than or equal to 0.32, the values of temperature increase are stabilized between 166.3° C. and 165° C. Thus, because the temperature of the stator is further stabilized and suppressed by setting bt/ht to greater than or equal to 0.22, or less than or equal to 0.32, a high output automotive alternator can be achieved.

Moreover, in Embodiment 1 above, the winding phase portions are each constituted by a distributed winding portion installed in every third slot 44 such that strands of the conductor wire therein extend outwards from any given slot 44, the first half extending to the first circumferential side and entering the subsequent slot 44 three slots away on the first circumferential side, and the remaining second half thereof extending to the second circumferential side and entering the subsequent slot 44 three slots away on the second circumferential side, but similar effects can be achieved even if the stator winding phase portions are each constituted by a wave winding installed in every third slot 44 such that strands of the conductor wire therein extend outwards from any given slot 44, extend to the first circumferential side, and enter the subsequent slot 44 three slots away on the first circumferential side.

EMBODIMENT 2

Figure 7:
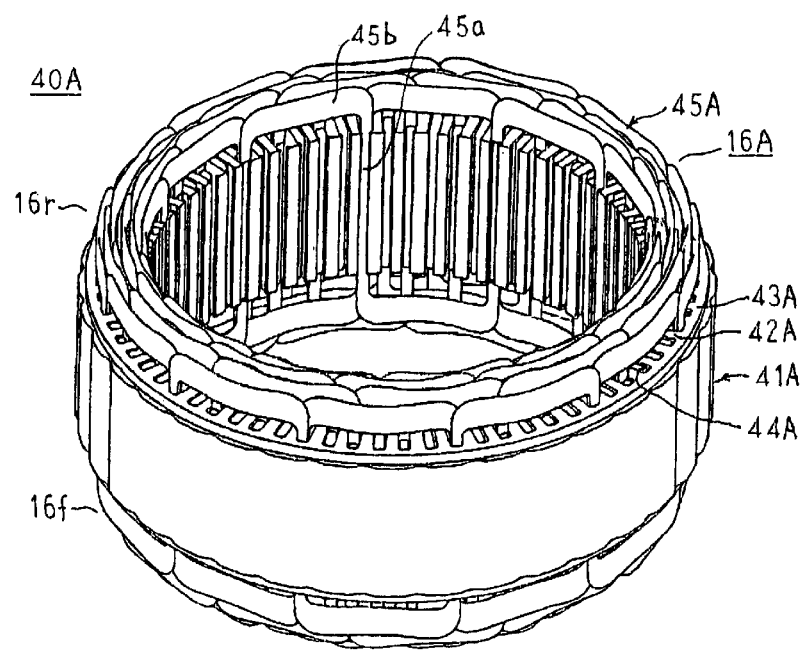
FIG. 7 is a perspective showing a stator of an automotive alternator according to Embodiment 2 of the present invention.
Figure 8:
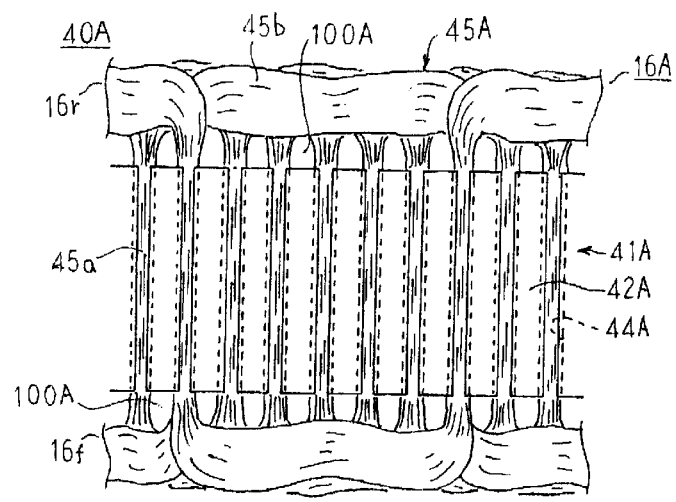
FIG. 8 is a partial side elevation showing the stator of the automotive alternator according to Embodiment 2 of the present invention.

FIG. 7 is a perspective showing a stator of an automotive alternator according to Embodiment 2 of the present invention, and FIG. 8 is a partial side elevation showing the stator of the automotive alternator according to Embodiment 2 of the present invention.

In FIGS. 7 and 8, a stator 40A is constituted by: a stator core 41A; and a stator winding 16A installed in the stator core 41A. The stator core 41A is prepared in a similar manner to the stator core 41 in Embodiment 1 above, and tooth portions 42A each extending from a base portion 43A thereof are formed at a ratio of bt/ht=0.25 (bt=2.5 mm, ht=10.0 mm). Moreover, there are seventy-two slots 44A formed in the stator core 41A. Here, because the number of magnetic poles in the rotor 7 is twelve, the slots are formed at a ratio of two per phase per pole.

The stator winding 16A is constituted by two three-phase alternating-current windings in each of which three of six winding phase portions 45A are formed into an alternating-current connection (a Y connection, for example), the winding phase portions 45A each being formed by winding a conductor wire 29 in a wave shape into every sixth slot 44A, the conductor wire 29 being composed of a copper wire material having a circular cross section coated with an electrical insulator.

The winding phase portions 45A are each constructed into a wave winding in which the conductor wire 29 is wound for a predetermined number of winds, the winding phase portions 45A each being formed into a distributed winding portion having a wave-shaped pattern composed of: twelve slot-housed portions 45a arranged at a pitch of six slots in a circumferential direction; and linking portions 45b linking together a first half of end portions of adjacent pairs of the slot-housed portions 45a alternately at first and second axial ends and linking together a second half of the end portions alternately at the first and second axial ends. Moreover, the slot-housed portions 45a of the winding phase portions 45A are arranged in a similar manner to the slot-housed portions 45a of the winding phase portions 45 shown in FIG. 4, but at a pitch of six slots. The winding phase portions 45A are installed in the stator core 41A such that the slot-housed portions 45a are housed in a corresponding group of slots 44A disposed at a pitch of six slots in a circumferential direction.

The six winding phase portions 45A are installed in the stator core 41A so as to be offset from each other by a pitch of one slot (1P) in a circumferential direction and are stacked into six layers radially. The coil ends (the linking portions 45b) of the six winding phase portions 45A constitute front-end and rear-end coil end groups 16f and 16r of the stator winding 16A In the stator 40A constructed in this manner, ventilation channels 100A formed by the coil end groups 16f and 16r and the tooth portions 42A of the stator core 41A are also arranged circumferentially. Moreover, although not shown, a varnish is impregnated into the slots 44A which house the stator winding 16A, fixing the stator winding 16A to the stator core 41A.

The rest of the embodiment is constructed in a similar manner to Embodiment 1 above.

According to Embodiment 2, because the tooth portions 42A of the stator core 41A are each formed at a ratio of bt/ht=0.25, heat dissipation from the coil end groups 16f and 16r is large compared to Embodiment 1 above, where the ratio of bt/ht equals 0.35, thereby enabling temperature increases in the stator 40A to be suppressed.

Because the slots 44A are formed at a ratio of two per phase per pole, the number of ventilation channels 100A formed between the coil end groups 16f and 16r and end surfaces of the stator core 41A is twice the number in Embodiment 1 above, further suppressing temperature increases in the stator 40A and reducing wind noise.

EMBODIMENT 3

Figure 9:
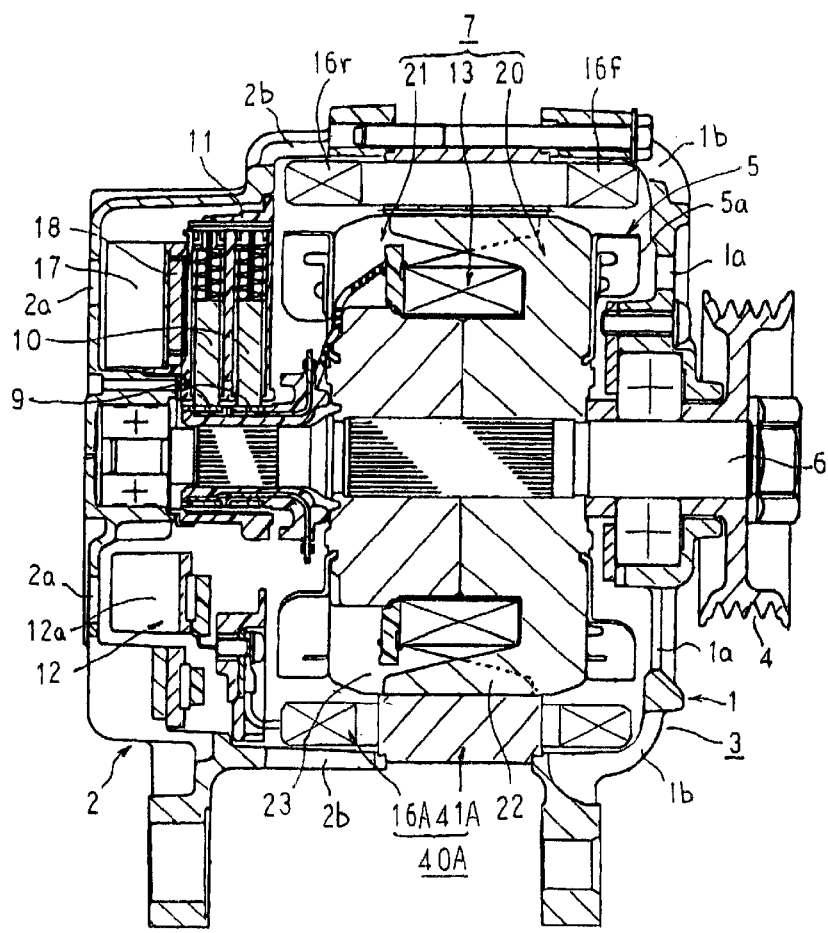
FIG. 9 is a cross section showing an automotive alternator according to Embodiment 3 of the present invention.

As shown in FIG. 9, in Embodiment 3, the entire axial lengths of blades 5a of the cooling fans 5 substantially overlap the coil end groups 16f and 16r in a radial direction. The rest of the embodiment is constructed in a similar manner to Embodiment 2 above.

According to Embodiment 3, because the entire axial lengths of the blades 5a of the cooling fans 5 substantially overlap the coil end groups 16f and 16r in a radial direction, cooling airflows generated by the cooling fans are reliably supplied to the coil end groups 16f and 16r, increasing cooling of the coil end groups 16f and 16r. In addition, because discharge sides of the cooling fans 5 are shielded by the coil end groups 16f and 16r, sound propagation is effectively blocked, reducing wind noise.

EMBODIMENT 4

Figure 10:
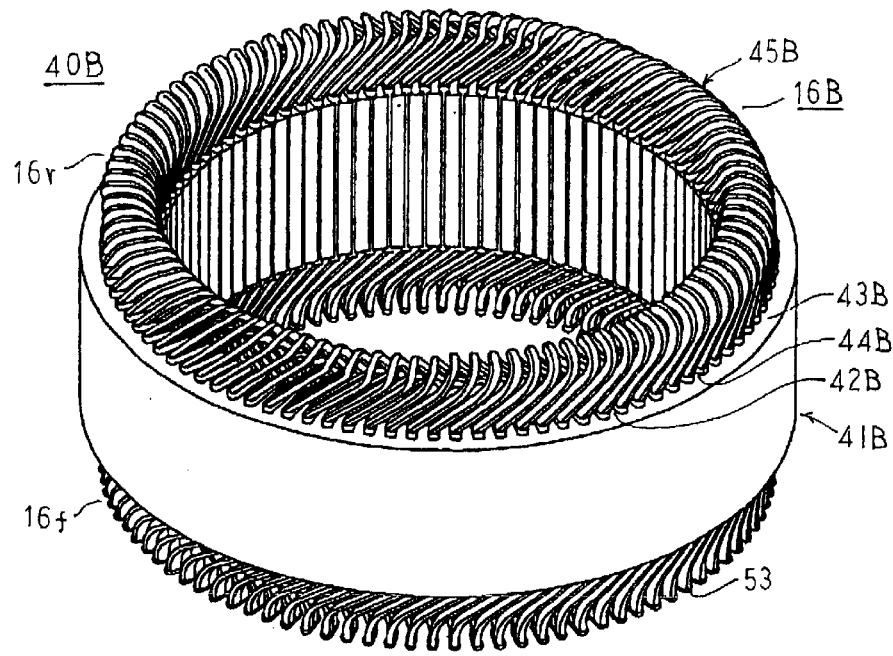
FIG. 10 is a perspective showing a stator of an automotive alternator according to Embodiment 4 of the present invention.
Figure 11:
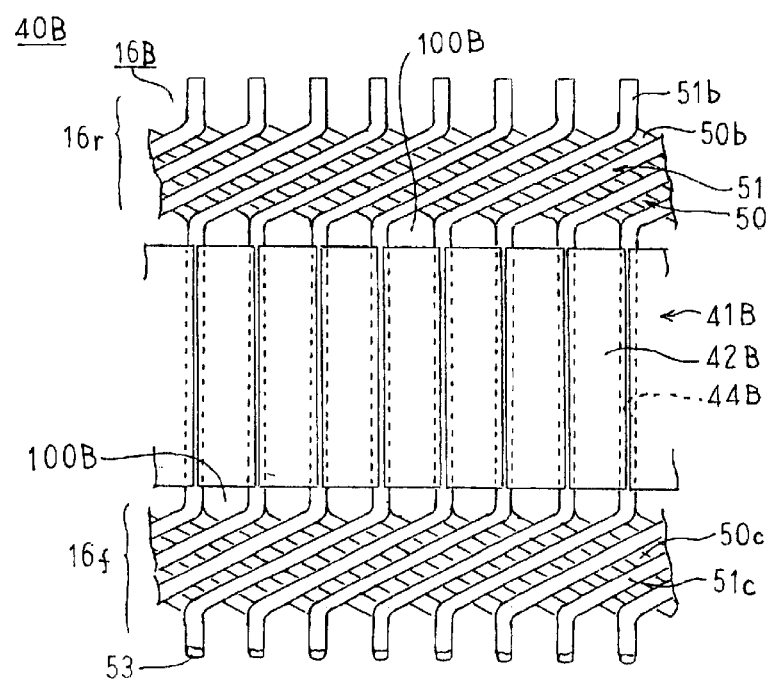
FIG. 11 is a partial side elevation showing the stator of the automotive alternator according to Embodiment 4 of the present invention.
Figure 12:
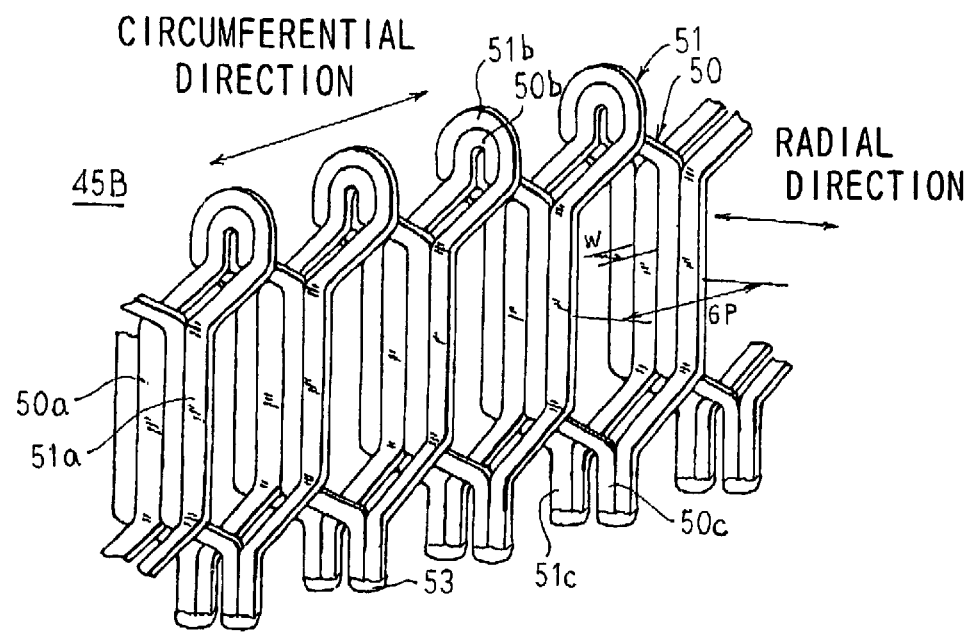
FIG. 12 is a partial perspective schematically showing one winding phase portion constituting a stator winding of the automotive alternator according to Embodiment 4 of the present invention.

FIG. 10 is a perspective showing a stator of an automotive alternator according to Embodiment 4 of the present invention, FIG. 11 is a partial side elevation showing the stator of the automotive alternator according to Embodiment 4 of the present invention, and FIG. 12 is a partial perspective explaining a construction of one winding phase portion of a stator winding in the stator in FIG. 10.

In FIGS. 10 to 12, a stator 40B is constituted by: a stator core 41B; and a stator winding 16B installed in the stator core 41B. The stator core 41B is prepared in a similar manner to the stator core 41A in Embodiment 2 above, and tooth portions 42B each extending from a base portion 43B thereof are each formed at a ratio of bt/ht=0.25 (bt=2.5 mm, ht=10.0 mm). Moreover, there are ninety-six slots 44B formed in the stator core 41B. Here, a rotor having sixteen magnetic poles is used, the slots being formed at a ratio of two per phase per pole.

The stator winding 16B is constituted by two three-phase alternating-current windings in each of which three of six winding phase portions 45B are formed into an alternating-current connection (a Y connection, for example), the winding phase portions 45B each being formed by inserting a large number of first and second conductor segments 50 and 51 into the slots 44B and joining together free end portions of the conductor segments 50 and 51, the first and second conductor segments 50 and 51 being composed of a copper wire material having a rectangular cross section coated with an electrical insulator.

The rest of the embodiment is constructed in a similar manner to Embodiment 2 above.

A construction of the stator winding 16B will now be explained in detail.

Each of the winding phase portions 45B is constituted by a large number of the first conductor segments 50 and a large number of the second conductor segments 51. The first conductor segments 50 are each formed by bending a short length of the copper wire material having the rectangular cross section coated with the electrical insulator into a general U shape in which a pair of first slot-housed portions 50a face each other so as to be separated at a pitch of six slots circumferentially and are offset radially by a width (W) of the first conductor segment 50 by means of a first turn portion 50b. Furthermore, the second conductor segments 51 are each formed by bending a short length of the copper wire material having the rectangular cross section coated with the electrical insulator into a general U shape in which a pair of second slot-housed portions 51a face each other so as to be separated at a pitch of six slots circumferentially and are offset radially by a predetermined amount by means of a second turn portion 51b. The amount of radial offset between the pair of second slot-housed portions 51a corresponds to an amount in which two first slot-housed portions 50a can be accommodated.

The first conductor segments 50 are inserted into the stator core 41B from a rear end into pairs of slots 44B six slots apart, and first free end portions 50c extending outwards at a front end are bent into a splayed shape. Here, the first conductor segments 50 are each inserted into a second position in a slot depth direction (corresponding to the radial direction) ("a second address") in a first slot of each of the pairs of slots 44B, and into a third position in the slot depth direction ("a third address") in a second slot of each of the pairs of slots 44B.

The second conductor segments 51 are inserted into the stator core 41B from a rear end into the pairs of slots 44B into which the first conductor segments 50 are inserted, and second free end portions 51c extending outwards at the front end are bent into a splayed shape. Here, the second conductor segment 51 are each inserted into a fourth position in the slot depth direction ("a fourth address": deepest portion) in the first slot of each of the pairs of slots 44B, and into a first position in the slot depth direction ("a first address": shallowest portion) in the second slot of each of the pairs of slots 44B.

Then, the second free end portions 51c of the second conductor segments 51 extending outwards at the front end from the first address and the first free end portions 50c of the first conductor segments 50 extending outwards at the front end from the second address are lined up in a radial direction and joined together by welding, soldering, etc. Similarly, the first free end portions 50c of the first conductor segments 50 extending outwards at the front end from the third address and the second free end portions 51c of the second conductor segments 51 extending outwards at the front end from the fourth address are lined up in a radial direction and joined together by welding, soldering, etc. Thus, four winding sub-portions having one turn each are formed by linking large numbers of the first and second conductor segments 50 and 51. Then, the first winding phase portion 45B, which has four turns, is constructed by connecting the four winding sub-portions in series.

Here, the four first and second slot-housed portions 50a and 51a are housed in each of the slots 44B so as to line up in one row with the longitudinal axes of the rectangular cross sections of the four first and second slot-housed portions 50a and 51a aligned in the slot depth direction. At the rear end, the first and second turn portions 50b and 51b are stacked up in two layers axially and arranged circumferentially at a pitch of six slots. At the front end, joint portions 53 joining the first and second free end portions 50c and 51c are lined up radially and arranged in two rows in a circumferential direction at a pitch of six slots. Moreover, the first and second turn portions 50b and 51b constitute rear-end coil ends, and the first and second free end portions 50c and 51c which are linked by the joint portions 53 constitute front-end coil ends.

The six winding phase portions 45B are installed in the stator core 41B so as to be offset from each other by one slot in a circumferential direction, constituting the stator 40B. The first and second free end portions 50c and 51c which are linked by the joint portions 53 are arranged circumferentially at a pitch of one slot to form two rows, constituting the front-end coil end group 16f. The first and second turn portions 50b and 51b which are stacked up in two layers axially are arranged circumferentially at a pitch of one slot, constituting the rear-end coil end group 16r. Thus, ventilation channels 100B are formed between the front-end and rear-end coil end groups 16f and 16r and end surfaces of the stator core 41B. Moreover, each of the first and second conductor segments 50 and 51 constituting each of the winding phase portions 45B is installed in a wave winding so as to extend outwards at an end surface of the stator core 41B from an inner layer in any given slot 44B, fold over, and enter an outer layer in a slot 44B six slots away.

In Embodiment 4, because the tooth portions 42B extending from the base portion 43B are each formed at a ratio of bt/ht=0.25, temperature increases in the stator 40B can be suppressed in a similar manner to Embodiment 2 above.

The first and second free end portions 50c and 51c which are linked by the joint portions 53 are lined up neatly to form two rows in a circumferential direction, constituting the front-end coil end group 16f, and the first and second turn portions 50b and 51b are lined up neatly in a circumferential direction to form two layers in an axial direction, constituting the rear-end coil end group 16r. Thus, because the surface areas of the first and second conductor segments 50 and 51 which are exposed to the cooling airflows flowing through the ventilation channels 100B are increased, cooling of the stator is improved compared to Embodiment 2 above. In addition, because the ventilation channels 100B are arranged uniformly in a circumferential direction, and the ventilation channels 100B are formed in a generally uniform shape, the coil end groups 16f and 16r are cooled in a well-balanced manner, improving cooling of the stator and reducing wind noise compared to Embodiment 2 above.

EMBODIMENT 5

Figure 13:
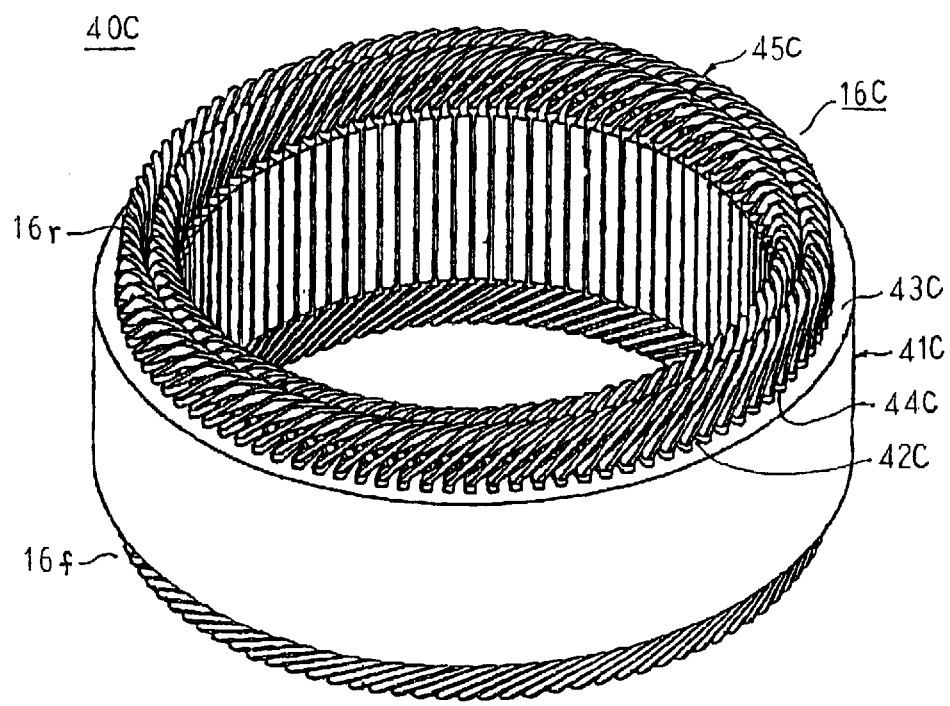
FIG. 13 is a perspective showing a stator of an automotive alternator according to Embodiment 5 of the present invention.
Figure 14:
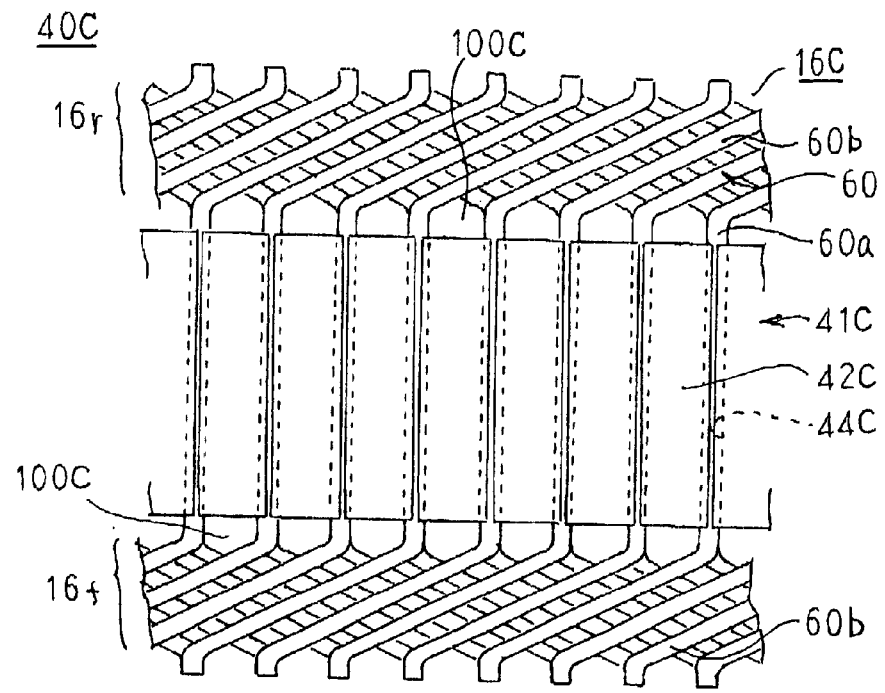
FIG. 14 is a partial side elevation showing the stator of the automotive alternator according to Embodiment 5 of the present invention.
Figure 15:
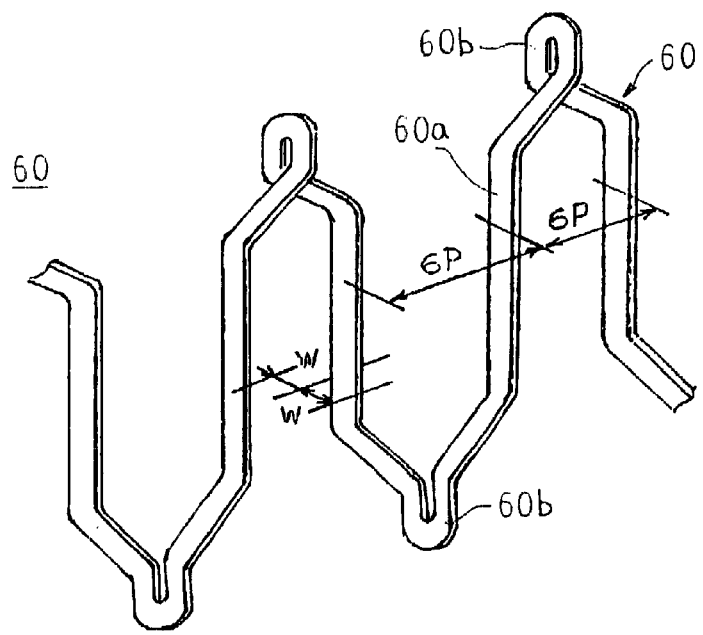
FIG. 15 is a partial perspective explaining a winding construction of a stator winding in the automotive alternator according to Embodiment 5 of the present invention.
Figure 16:
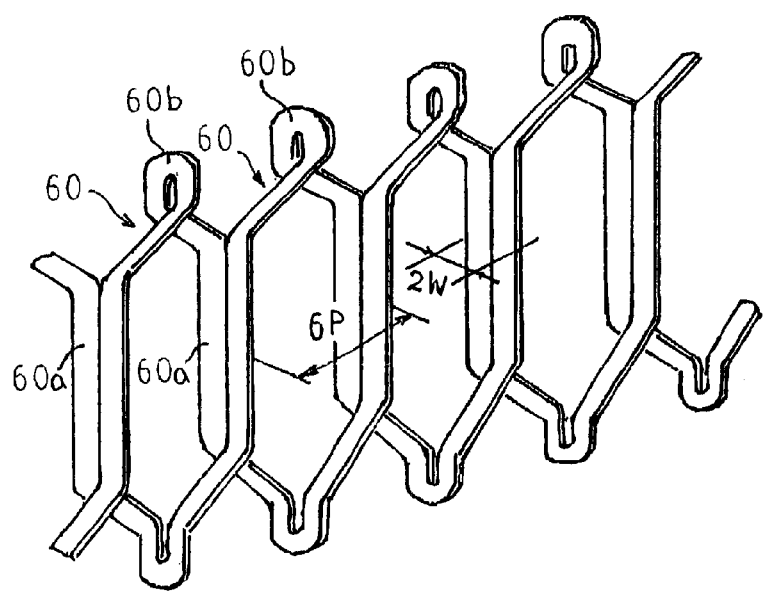
FIG. 16 is another partial perspective explaining the winding construction of the stator winding in the automotive alternator according to Embodiment 5 of the present invention.

FIG. 13 is a perspective showing a stator used in an automotive alternator according to Embodiment 5 of the present invention, FIG. 14 is a partial side elevation showing the stator used in the automotive alternator according to Embodiment 5 of the present invention, and FIGS. 15 and 16 are partial perspectives explaining a winding construction of a stator winding in the stator used in the automotive alternator shown in FIG. 13.

In Embodiment 5, continuous conductor wires 60 composed of a copper wire material having a rectangular cross section coated with an electrical insulator are used as electrical conductors.

In FIGS. 13 and 14, a stator 40C is constituted by: a stator core 41C; and a stator winding 16C installed in the stator core 41C. In the stator core 41C, tooth portions 42C extending from a base portion 43C thereof are each formed at a ratio of bt/ht=0.25 (bt=2.5 mm, ht=10.0 mm). Moreover, there are ninety-six slots 44C formed in the stator core 41C. Here, a rotor having sixteen magnetic poles is used, the slots being formed at a ratio of two per phase per pole.

The stator winding 16C is constituted by two three-phase alternating-current windings in each of which three of six winding phase portions 45C are formed into an alternating-current connection (a Y connection, for example), the winding phase portions 45C each being formed by winding one of the continuous conductor wires 60 in a wave shape into every sixth slot 44C.

The rest of the embodiment is constructed in a similar manner to Embodiment 4 above.

A construction of the stator winding 16C will now be explained in detail.

Each of the winding phase portions 45C is constituted by four continuous conductor wires 60 installed into one of six (first to sixth) slot groups constituted by every sixth slot 44C.

In a first slot group constituted by every sixth slot 44C, a first continuous conductor wire 60 is installed in a wave shape so as to alternately occupy the first address and the second address in every sixth slot 44C, and a second continuous conductor wire 60 is installed in a wave shape so as to alternately occupy the second address and the first address in every sixth slot 44C, forming two inner circumferential winding sub-portions having one turn each. In addition, a third continuous conductor wire 60 is installed in a wave shape so as to alternately occupy the third address and the fourth address in every sixth slot 44C, and a fourth continuous conductor wire 60 is installed in a wave shape so as to alternately occupy the fourth address and the third address in every sixth slot 44C, forming two outer circumferential winding sub-portions having one turn each. A first winding phase portion 45C having four turns is formed by connecting these inner circumferential winding sub-portions and outer circumferential winding sub-portions in series.

In addition, in second to sixth slot groups constituted by every sixth slot 44C, continuous conductor wires 60 are similarly installed, and second to sixth winding phase portions 45C having four turns each are formed by connecting the inner circumferential winding sub-portions and the outer circumferential winding sub-portions in series.

Two three-phase alternating-current windings are constructed by connecting three of the first to sixth winding phase portions 45C constructed in this manner into each of two alternating-current connections. The two three-phase alternating-current windings constitute the stator winding 16C.

Moreover, four continuous conductor wires 60 are housed in each of the slots 44C so as to line up in one row in a slot depth direction (radial direction) with the longitudinal axis of the rectangular cross sections of the continuous conductor wires 60 aligned with the slot depth direction.

Here, as shown in FIG. 15, each of the inner circumferential winding sub-portions is constructed into a wave-shaped pattern in which straight portions 60a of the continuous conductor wires 60 are disposed at a pitch of six slots so as to be offset by a width (W) of the continuous conductor wires 60 alternately on a first and second side of a direction of disposal by turn portions 60b of the continuous conductor wires 60. As shown in FIG. 16, two inner circumferential winding sub-portions installed in a common slot group are offset by a pitch of six slots from each other to form a winding sub-portion pair in which the straight portions 60a are disposed one on top of another. In addition, the inner circumferential winding sub-portions of the first to sixth winding phase portions are constructed such that the winding sub-portion pairs therein are arranged to be offset by a pitch of one slot from those of the next winding phase portion. Moreover, the outer circumferential winding sub-portions are constructed in a similar manner to the inner circumferential winding sub-portions.

In the stator 40C manufactured in this manner, the stator winding 16C is constituted by twenty-four winding sub-portions 45C having one turn each, each being constructed by installing one continuous conductor wire 60 so as to alternately occupy an inner layer and an outer layer in a slot depth direction in every sixth slot 44C.

Coil ends folded over outside the slots at front-end and rear-end surfaces of the stator core 41C, that is, the turn portions 60b of the continuous conductor wires 60, are arranged uniformly in a circumferential direction to form two rows in a radial direction, constituting front-end and rear-end coil end groups 16f and 16r.

Thus, in Embodiment 5, because the tooth portions 42C disposed so as to extend from the base portion 43C are each formed at a ratio of bt/ht=0.25, temperature increases in the stator 40C can be suppressed in a similar manner to Embodiment 4 above.

The turn portions 60b are lined up neatly in a circumferential direction to form two rows, constituting the front-end and rear-end coil end groups 16f and 16r. Thus, because the surface areas of the continuous conductor wires 60 which are exposed to the cooling airflows flowing through the ventilation channels 100C are increased and the ventilation channels 100C are arranged uniformly in a circumferential direction, cooling of the stator is improved and wind noise is reduced in a similar manner to Embodiment 4 above.

In Embodiment 5, because each winding sub-portion 45C having one turn is constituted by one continuous conductor wire 60, the complicated operations of inserting and joining the first and second conductor segments 50 and 51 required in Embodiment 4 above can be omitted.

In Embodiment 4 above, the front-end coil end group 16f is constituted by coil ends formed by joining together the first and second free end portions 50c and 51c of the first and second conductor segments 50 and 51. Thus, because the joint portions 53 are present on apex portions of the coil ends, wind noise was generated due to interference between the cooling airflows and the joint portions 53. In Embodiment 5, on the other hand, the front-end coil end group 16f is constituted in a similar manner to the rear-end coil end group 16r by coil ends constituted by the turn potions 60b of the continuous conductor wires 60. Thus, wind noise resulting from interference between the cooling airflows and the joint portions 53 is eliminated, enabling wind noise to be reduced.

Next, a method for assembling the stator 40C according to Embodiment 5 will be explained with reference to FIGS. 17 to 20C.

Figure 17:
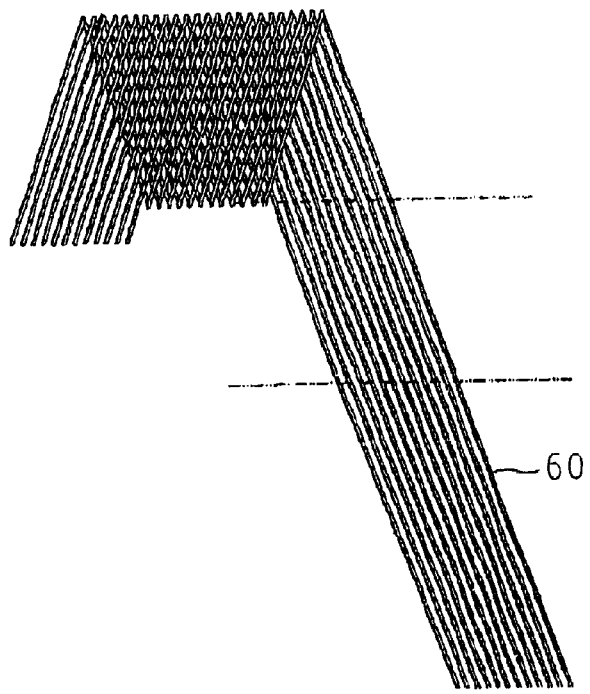
FIG. 17 is a diagram explaining a method for manufacturing the stator of the automotive alternator according to Embodiment 5 of the present invention.

First, twelve continuous conductor wires 60 are lined up in a plane at a pitch of one slot. Then, as shown in FIG. 17, the twelve continuous conductor wires 60 are folded over together at a predetermined pitch (at the positions of the double-dotted chain lines), forming a strip-shaped winding unit 61 in which the twelve continuous conductor wires 60 are wound into a helical shape.

Figure 18:
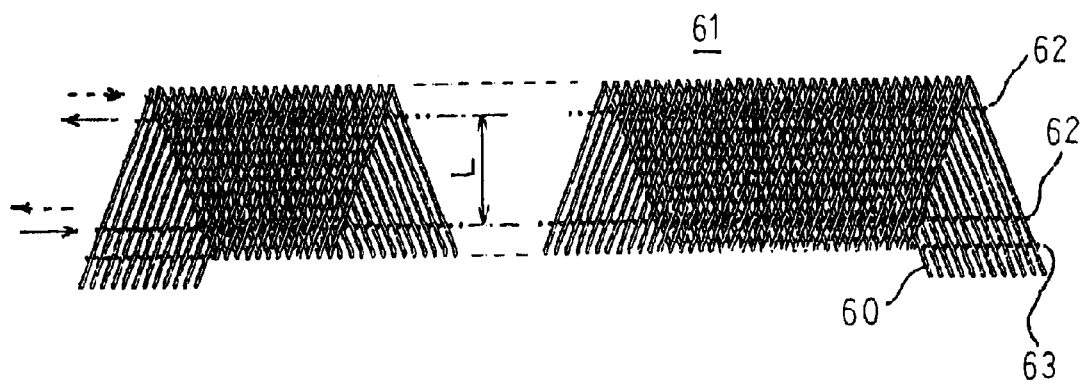
FIG. 18 is another diagram explaining the method for manufacturing the stator of the automotive alternator according to Embodiment 5 of the present invention.

A first pair of pin groups 62 is inserted between the continuous conductor wires 60 from a front side of the winding unit 61 at positions separated by a distance L relative to a width direction of the winding unit 61. Similarly, a second pair of pin groups 62 is inserted between the continuous conductor wires 60 from a rear side of the winding unit 61 at positions separated by a distance L in a width direction of the winding unit 61. In addition, position-regulating pin groups 63 are inserted between the continuous conductor wires 60 at end portions in a width direction of the winding unit 61. Thus, the first, second, and position-regulating pin groups 62 and 63 are set as shown in FIG. 18. Here, the distance L generally matches a groove length of the slots 44C (an axial length of the stator core 41C).

Then, the pin groups 62 in the first pair of pin groups 62 inserted between the continuous conductor wires 60 from the front side of the winding unit 61 are moved in mutually opposite directions in a longitudinal direction of the winding unit 61, as indicated by solid arrows in FIG. 18. Similarly, the pin groups 62 in the second pair of pin groups 62 inserted between the continuous conductor wires 60 from the rear side of the winding unit 61 are moved in mutually opposite directions in the longitudinal direction of the winding unit 61, as indicated by broken arrows in FIG. 18. At this time, the continuous conductor wires 60 are prevented from coming apart because the position-regulating pin groups 63 are inserted between the continuous conductor wires 60.

Figure 19:
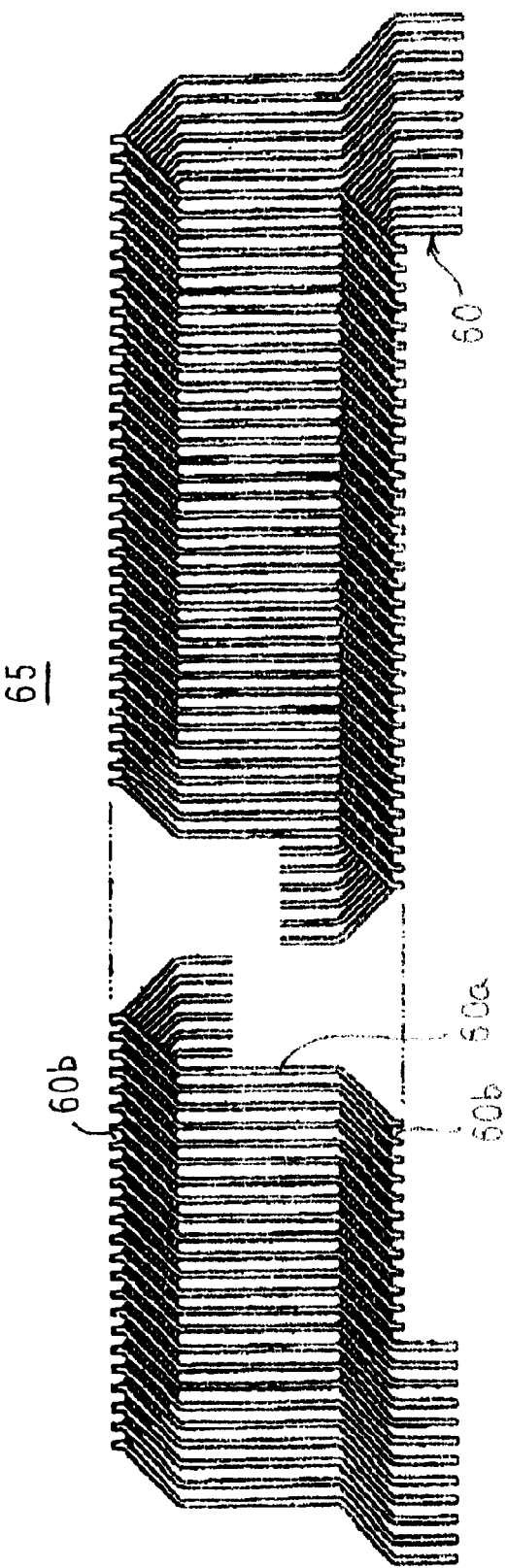
FIG. 19 is a plan showing a winding assembly used in the stator winding of the stator in the automotive alternator according to Embodiment 5 of the present invention.

Thus, the portions of the continuous conductor wires 60 positioned between the pairs of pin groups 62 are deformed so as to become perpendicular to the longitudinal direction of the winding unit 61, becoming the straight portions 60a housed inside the slots 44C. The portions of the continuous conductor wires 60 positioned outside the pairs of pin groups 62 become the turn portions 60b linking straight portions 60a six slots apart. The winding assembly 65 shown in FIG. 19 is manufactured in this manner. This winding assembly 65 has a construction equivalent to six of the winding sub-portion pairs shown in FIG. 16 offset by a pitch of one slot from each other. In other words, the winding assembly 65 is constructed such that the continuous conductor wires 60 are formed into a pattern in which the straight portions 60a are disposed at a pitch of six slots and linked by the turn portions 60b and adjacent straight portions 60a are alternately offset by a width of the continuous conductor wires 60 on a first and second side of a direction of disposal by the turn portions 60b, pairs of continuous conductor wires 60 being formed by disposing two continuous conductor wires 60 so as to be offset by a pitch of six slots from each other with straight portions 60a stacked one on top of another, six pairs of continuous conductor wires 60 being offset by a pitch of one slot from each other.

Figure 20A:
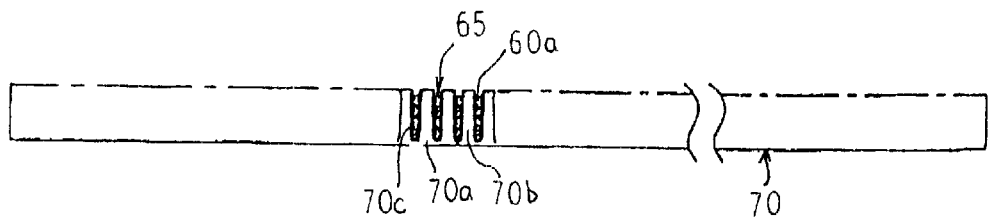
FIG. 20A is a yet another diagram explaining a method for manufacturing the stator of the automotive alternator according to Embodiment 5 of the present invention.
Figure 20B:
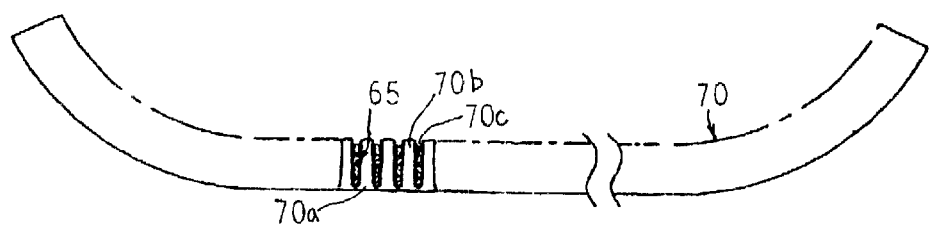
FIG. 20B is yet another diagram explaining the method for manufacturing the stator of the automotive alternator according to Embodiment 5 of the present invention.
Figure 20C:
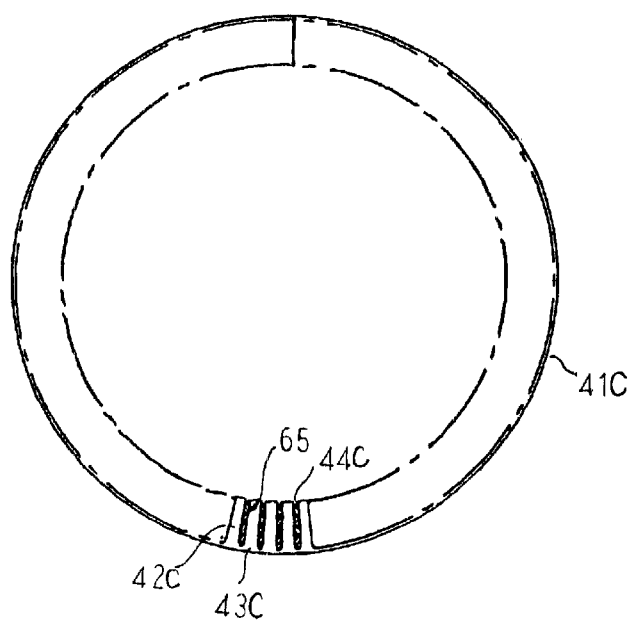
FIG. 20C is yet another diagram explaining the method for manufacturing the stator of the automotive alternator according to Embodiment 5 of the present invention.
Figure 22:
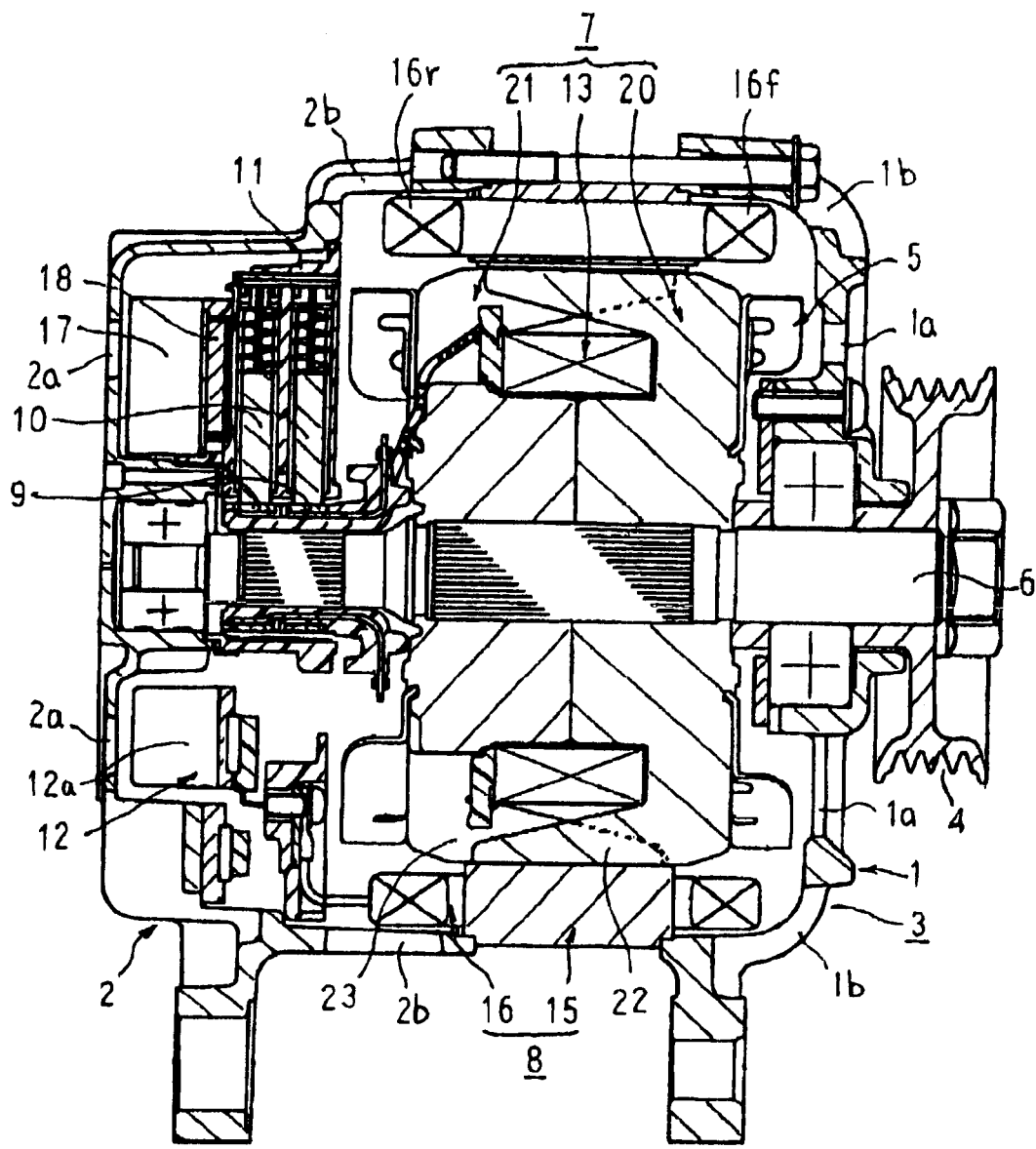
FIG. 22 is a cross section showing a conventional automotive alternator.
Figure 23:
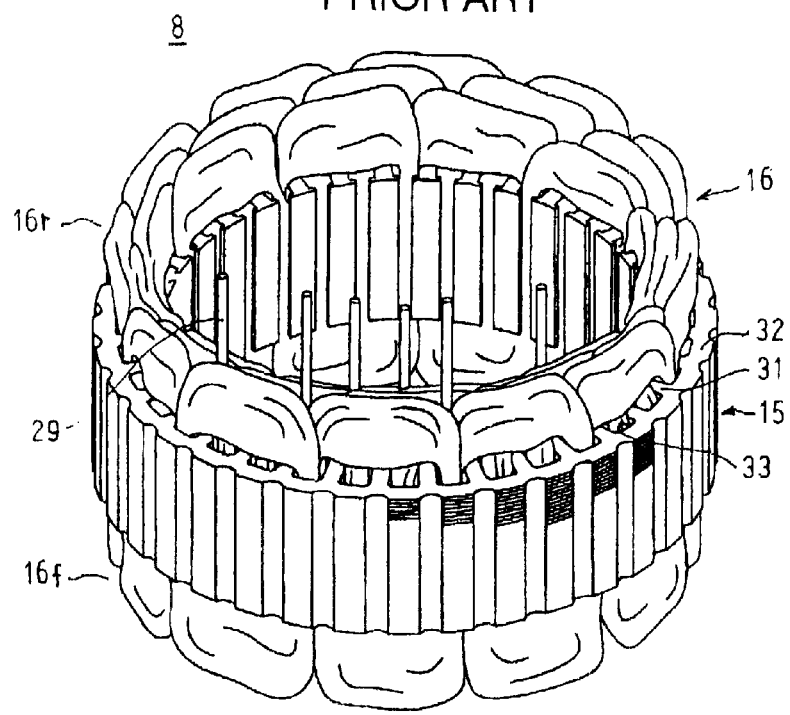
FIG. 23 is a perspective showing a stator used in the conventional automotive alternator.
Figure 24:
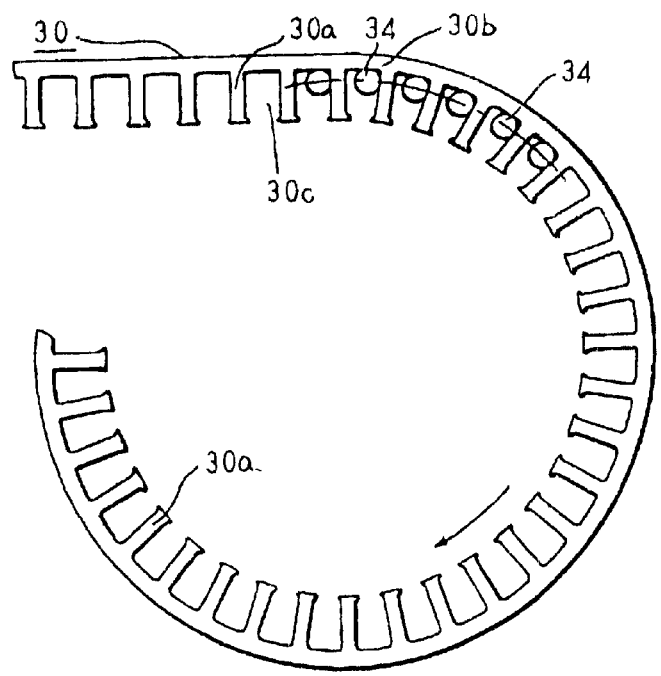
FIG. 24 is a schematic diagram explaining a method for manufacturing a conventional stator core.
Figure 25:
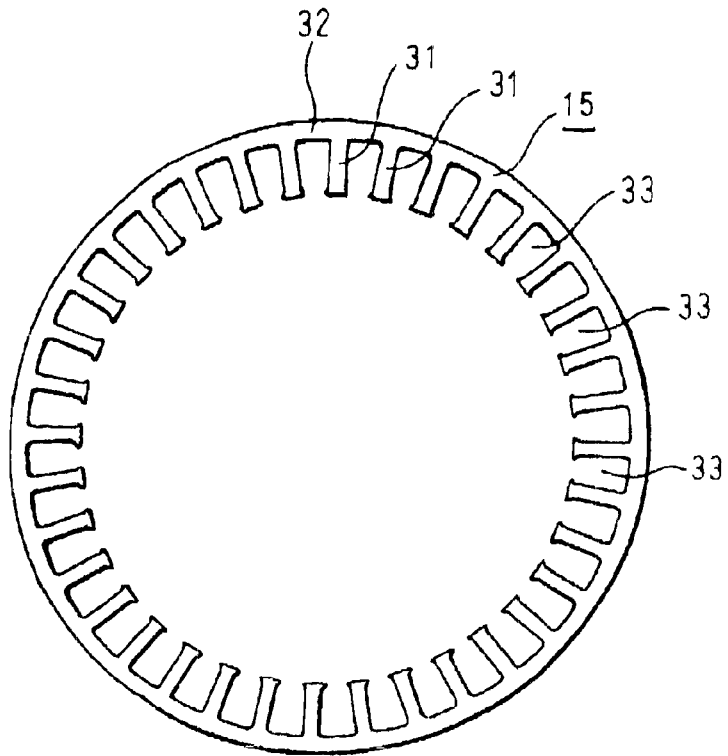
FIG. 25 is a plan showing the conventional stator core.
Figure 26:
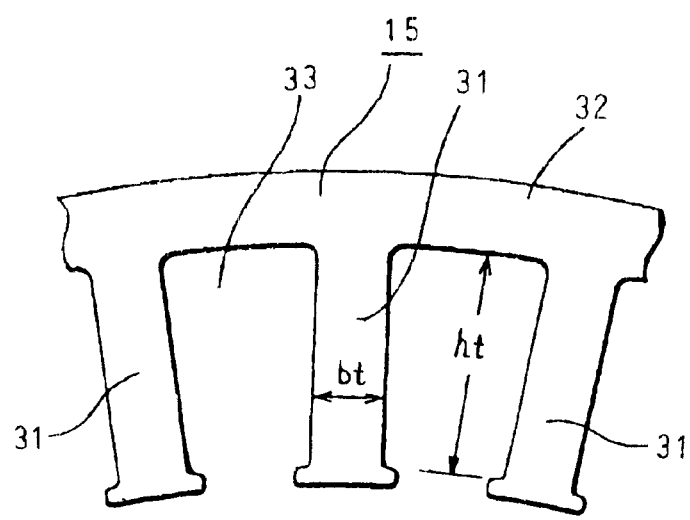
FIG. 26 is an enlarged partial plan showing the conventional stator core.

A rectangular parallelepiped core 70 is manufactured by laminating a predetermined number of magnetic steel plates 30 cut to a predetermined length and laser welding outer circumferential portions thereof. The rectangular parallelepiped core 70 includes: a base portion 70a; tooth portions 70b disposed so as to extend from the base portion 70a at a predetermined pitch; and slots 70c which are defined by the base portion 70a and adjacent pairs of the tooth portions 70b. Insulators (not shown) are mounted in each of the slots 70c of the rectangular parallelepiped core 70, and then, as shown in FIG. 20A, two winding assemblies 65 are mounted one on top of the other in the rectangular parallelepiped core 70 by inserting the straight portions 60a into the slots 70c. Next, as shown in FIG. 20B, the rectangular parallelepiped core 70 mounted with the two winding assemblies 65 is rolled up. Then, as shown in FIG. 20C, first and second end portions of the rolled up core 70 are abutted, and the abutted portions are laser welded to obtain the cylindrical stator core 41C mounted with the two winding assemblies 65. In addition, the continuous conductor wires 60 are connected to obtain the stator 40C shown in FIG. 13.

Because the winding assembly 65 constructed by integrating twelve continuous conductor wires 60 each formed into a wave shape so as to alternately occupy an inner layer and an outer layer in a slot depth direction in every sixth slot 44C is manufactured this manner, the operation of installing the stator winding 16C is simplified and the number of joints in the continuous conductor wires 60 is significantly reduced, improving the rate at which the stator can be produced.

Now, the winding assembly 65 used in Embodiment 5 above is manufactured so as to be constituted by a group of winding sub-portions 45C each having one turn when installed in the stator core 41C, but winding assembly units may be used in which the winding assembly 65 is divided into two or three parts in a longitudinal direction. In that case, the group of winding sub-portions 45C each having one turn is constructed by installing the winding assembly units in the rectangular parallelepiped core 70 so as to line up in one row, rolling up the rectangular parallelepiped core 70, abutting and joining first and second end portions of the core 70, then joining each of the continuous conductor wires 60 in the winding assembly units.

In Embodiment 5 above, because the slots are formed at a ratio of two per phase per pole, the winding assembly 65 is manufactured using twelve continuous conductor wires 60, but the invention can be applied to cases in which the slots are formed at a ratio of one or three or more per phase per pole, and the number of continuous conductor wires 60 constituting the winding assembly 65 may be selected appropriately so as to match the ratio of slots per phase per pole. For example, when the slots are formed at a ratio of one per phase per pole, the winding assembly is constructed such that the continuous conductor wires are formed into pattern in which straight portions are disposed at a pitch of three slots linked by turn portions, and adjacent straight portions are alternately offset by a width of the continuous conductor wires on a first and second side of a direction of disposal by the turn portions, pairs of continuous conductor wires being formed by disposing two continuous conductor wires so as to be offset by a pitch of three slots from each other with straight portions stacked one on top of another, three pairs of continuous conductor wires being offset by a pitch of one slot from each other.

In Embodiment 5 above, the continuous conductor wires 60 of the winding assembly 65 are formed into a pattern in which the straight portions 60a are alternately offset by a width of the continuous conductor wires 60 by the turn portions 60b, but continuous conductor wires of a winding assembly may be formed into a pattern in which straight portions are alternately offset by twice a width of the continuous conductor wires by turn portions. In that case, an air gap equivalent to two continuous conductor wires is formed between the straight portions of continuous conductor wires constituting a pair, and a stator winding similar to that of Embodiment 4 can be obtained by inserting the above-mentioned winding assembly 65 into a winding assembly manufactured in this manner and installing the two winding assemblies into a stator core.

EMBODIMENT 6

Figure 21:
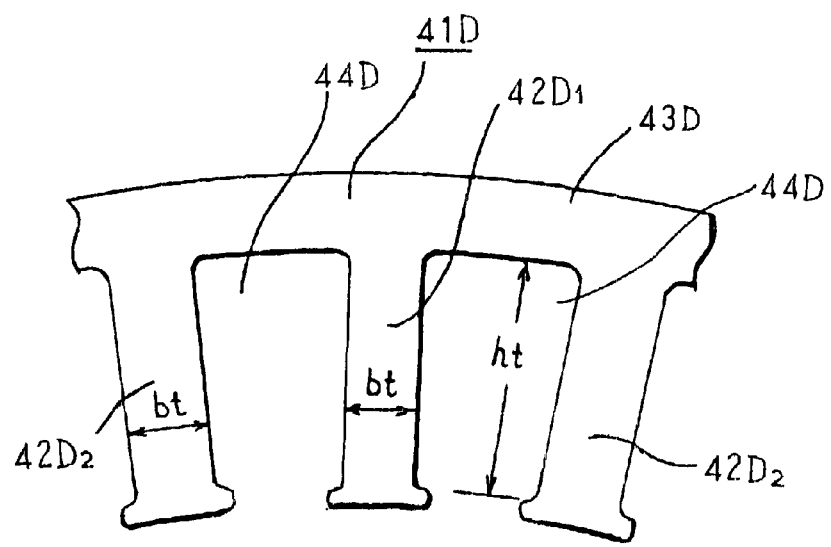
FIG. 21 is an enlarged partial plan showing a stator core of a stator of an automotive alternator according to Embodiment 6 of the present invention.

As shown in FIG. 21, in Embodiment 6, first and second tooth portions $42D_1$ and $42D_2$ of a stator core 41D are disposed so as to extend from a cylindrical base portion 43D alternately in a circumferential direction. The first tooth portions $42D_1$ are each formed at a ratio of bt/ht=0.2 (bt=2.0 mm, ht=10.00 mm), and the second tooth portions $42D_2$ are each formed at a ratio of bt/ht=0.3 (bt=3.0 mm, ht=10.00 mm). Furthermore, ninety-six slots 44D are formed, each of which is defined by the base portion 43D and a pair of adjacent tooth portions constituted by one first tooth portion $42D_1$ and one second tooth portion $42D_2$.

The rest of the embodiment is constructed in a similar manner to Embodiment 5 above.

Because Embodiment 6 includes the first tooth portions $42D_1$, which are each formed at a ratio of bt/ht=0.2, and the second tooth portions $42D_2$, which are each formed at a ratio of bt/ht=0.3, temperature increases in the stator can be suppressed in a similar manner to Embodiment 5 above.

In Embodiment 6, because the first tooth portions $42D_1$, which each have a width bt of 2.0 mm, and the second tooth portions $42D_2$, which each have a width bt of 3.0 mm, are disposed alternately in a circumferential direction, the slots 44D are arranged at a nonuniform pitch in a circumferential direction. In other words, ventilation channels formed by coil end groups and the tooth portions $42D_1$ and $42D_2$ of the stator core 41D are arranged at a nonuniform pitch in a circumferential direction. Furthermore, the width of the ventilation channels is nonuniform. Thus, because periodic wind noise arising due to cooling airflows passing through ventilation channels which are disposed at an even angular pitch in a circumferential direction is dispersed by arranging the ventilation channels at a nonuniform pitch in the circumferential direction, wind noise can be reduced.

Moreover, each of the above embodiments has been explained with reference to stator cores in which the slots are formed at a ratio of one or two per phase per pole, but similar effects can also be achieved if the present invention is applied to a stator core in which slots are formed at a ratio of three or more per phase per pole.

Each of the above embodiments has been explained as applying to an automotive alternator of the type in which the field winding 13 is installed in the first and second pole cores 20 and 21 so as to be covered by the first and second claw-shaped magnetic poles 22 and 23 and rotate with the first and second claw-shaped magnetic poles 22 and 23 and the field current is supplied to the field winding through the brushes 10, but similar effects will also be exhibited if the present invention is applied to a brushless automotive alternator in which a field winding is secured to a bracket and a rotating magnetic field is supplied to a stator through air gaps.

The present invention is constructed in the above manner and exhibits the effects described below.

According to one aspect of the present invention, there is provided an automotive alternator including:
  a shaft rotatably supported by a case;
  a rotor fixed to the shaft, the rotor being provided with:
    a field winding for generating a magnetic flux on passage of an electric current therethrough; and
    a plurality of claw-shaped magnetic poles disposed circumferentially on an outer circumferential side of the field winding, the claw-shaped magnetic poles being magnetized by the magnetic flux generated by the field winding; and
  a stator provided with:
    a cylindrical stator core supported by the case so as to envelop the rotor, a plurality of slots extending axially being formed in the stator core so as to line up circumferentially; and
    a stator winding installed in the stator core,
  wherein the stator core is constructed by laminating a magnetic steel plate, the stator core being provided with:
    a cylindrical base portion;

a plurality of tooth portions disposed so as to extend from the base portion toward an axial center; and the plurality of slots, each of the slots being defined by the base portion and an adjacent pair of the tooth portions;

ventilation channels are formed by a coil end group of the stator winding and the tooth portions of the stator core, a cooling airflow generated by rotation of the rotor flowing through each of the ventilation channels in a radial direction from an inner circumferential side; and each of the tooth portions is formed such that a radial length ht and a width bt thereof satisfy an expression $0.15 < bt/ht < 0.4$, thereby providing an automotive alternator in which temperature increases in the stator are suppressed, heat degradation tolerance is improved, and deterioration in electrical insulation can be suppressed.

A cooling fan may be fixed to an axial end surface of the rotor, improving cooling of the stator.

Air discharge apertures may be formed in a radial side surface of the case so as to correspond to the ventilation channels, increasing cooling of the stator and reducing wind noise.

An entire axial length of a blade of the cooling fan may substantially overlap the coil end group in a radial direction, further increasing cooling of the stator and effectively blocking sound propagation, thereby reducing wind noise.

The stator winding may be installed in the stator core as a distributed winding, reducing irregularities on inner wall surfaces of the ventilation channels, thereby improving cooling of the stator The stator winding may be constituted by a plurality of winding sub-portions each constructed by installing an electrical conductor so as to alternately occupy an inner layer and an outer layer in a slot depth direction in the slots at a predetermined slot interval, whereby the ventilation channels are arranged uniformly in a circumferential direction and the ventilation channels are each formed in a generally uniform shape, cooling the coil end groups in a well-balanced manner, thereby improving cooling of the stator.

The slots may be formed at a ratio of two or more per phase per pole, increasing the number of ventilation channels and improving cooling of the stator.

The ventilation channels may be arranged at a non-uniform pitch, dispersing periodic wind noise caused by the cooling airflows on passage through the ventilation channels, thereby reducing wind noise.

What is claimed is:

1. An automotive alternator comprising:
    a shaft rotatably supported by a case;
    a rotor fixed to said shaft, said rotor being provided with:
        a field winding for generating a magnetic flux on passage of an electric current therethrough; and
        a plurality of claw-shaped magnetic poles disposed circumferentially on an outer circumferential side of said field winding, said claw-shaped magnetic poles being magnetized by said magnetic flux generated by said field winding; and
    a stator provided with:
        a cylindrical stator core supported by said case so as to envelop said rotor, a plurality of slots extending axially being formed in said stator core so as to line up circumferentially; and
        a stator winding installed in said stator core,
    wherein said stator core is constructed by laminating a magnetic steel plate, said stator core being provided with:
        a cylindrical base portion;
        a plurality of tooth portions disposed so as to extend from said base portion toward an axial center; and
        said plurality of slots, each of said slots being defined by said base portion and an adjacent pair of said tooth portions;
    ventilation channels are formed by a coil end group of said stator winding and said tooth portions of said stator core, a cooling airflow generated by rotation of said rotor flowing through each of said ventilation channels in a radial direction from an inner circumferential side; and
    each of said tooth portions is formed such that a radial length ht and a width bt thereof satisfy an expression $0.15 < bt/ht < 0.4$.

2. The automotive alternator according to claim 1, further comprising a cooling fan fixed to an axial end surface of said rotor.

3. The automotive alternator according to claim 2 wherein an entire axial length of a blade of said cooling fan substantially overlaps said coil end group in a radial direction.

4. The automotive alternator according to claim 2 wherein air discharge apertures are formed in a radial side surface of said case so as to correspond to said ventilation channels.

5. The automotive alternator according to claim 4 wherein an entire axial length of a blade of said cooling fan substantially overlaps said coil end group in a radial direction.

6. The automotive alternator according to claim 1 wherein said stator winding is installed in said stator core as a distributed winding.

7. The automotive alternator according to claim 1 wherein said stator winding is constituted by a plurality of winding sub-portions each constructed by installing an electrical conductor so as to alternately occupy an inner layer and an outer layer in a slot depth direction in said slots at a predetermined slot interval.

8. The automotive alternator according to claim 1 wherein said slots are formed at a ratio of two or more per phase per pole.

9. The automotive alternator according to claim 1 wherein said ventilation channels are arranged at a non-uniform pitch.

10. An automotive alternator comprising:
    a case;
    a rotor mounted for rotation in said case; and
    a stator fixed to said case, said stator including a stator core surrounding a rotational axis of said rotor, said stator including a base portion and a plurality of tooth portions extending from said base portion toward said rotational axis;
    wherein each of said tooth portions has a radial length ht and a width bt that satisfies an expression $0.15 < bt/ht < 0.4$.

11. The automotive alternator according to claim 10, further comprising a cooling fan fixed to said rotor.

12. The automotive alternator according to claim 11, wherein an entire axial length of a blade of said cooling fan overlaps a coil end group of said stator in a radial direction.

13. The automotive alternator according to claim 11, wherein air discharge apertures are formed in a radial side surface of said case.

14. The automotive alternator according to claim 13, wherein an entire axial length of a blade of said cooling fan overlaps a coil end group of said stator in a radial direction.

15. The automotive alternator according to claim 10, wherein said stator includes a distributed winding installed in said stator core.

16. The automotive alternator according to claim 10, wherein said stator includes a plurality of winding sub-portions, each constructed by installing an electrical conductor so as to alternately occupy an inner layer and an outer layer in a slot depth direction in slots, which are defined by said base portion and adjacent pairs of said tooth portions, at a predetermined slot interval.

17. The automotive alternator according to claim 10, wherein said stator includes slots, which are defined by said base portion and adjacent pairs of said tooth portions, that are formed at a ratio of two or more per phase per pole.

18. The automotive alternator according to claim 10, further comprising ventilation channels formed by a coil end group of a stator winding of said stator and said tooth portions of said stator core, wherein said ventilation channels are arranged at a non-uniform pitch.

* * * * *